United States Patent [19]

Roberts, Jr. et al.

[11] 4,154,531

[45] May 15, 1979

[54] TIME BASE SWEPT-BEAM WHEEL ALIGNING SYSTEM

[75] Inventors: Thomas E. Roberts, Jr., Saratoga; Melvin H. Lill, San Jose; Andrew K. Chang, Malibu, all of Calif.

[73] Assignee: FMC Corporation, San Jose, Calif.

[21] Appl. No.: 896,651

[22] Filed: Apr. 17, 1978

[51] Int. Cl.² .............................................. G01B 11/26
[52] U.S. Cl. ..................................... 356/152; 356/155
[58] Field of Search ................... 356/1, 141, 152, 155, 356/172

[56] References Cited

U.S. PATENT DOCUMENTS

| | | | |
|---|---|---|---|
| 2,994,780 | 8/1961 | Wilcox, Jr. | 250/203 R |
| 3,782,831 | 1/1974 | Senften | 356/152 |
| 3,804,526 | 4/1974 | McKenney | 356/152 |
| 3,892,042 | 7/1975 | Senften | 356/155 |
| 4,097,157 | 6/1978 | Lill | 356/152 |

*Primary Examiner*—S. C. Buczinski
*Attorney, Agent, or Firm*—R. S. Kelly; J. F. Verhoeven

[57] ABSTRACT

A wheel alignment measuring system for measuring front wheel toe including a laser beam light projector mounted on a front wheel of a motor vehicle which projects a beam of light onto a pivotally mounted front mirror on the projector which oscillates back and forth through a ten degree angle about a reference line. The beam of light reflected from the oscillating mirror swings ten degrees on either side of a central reference beam line, and during its swing the beam strikes a fixed roof mirror mounted on the opposite front wheel of the vehicle. The thus reflected beam sweeps back and forth across the light projector and is successively intercepted by each of a pair of closely spaced photocells on the light projector, the cells being equally spaced on opposite sides of the reference beam line. The cells develop signals when they intercept the light beam which signals control and up/down counter through a flip-flop. The time interval required for the moving light beam to fall on a first cell, sweep in one outward direction and return in the opposite direction to the second cell is compared with the time interval required for the beam to continue its sweep from the second cell in said opposite direction and return in said one outward direction to the first cell. Such comparison is stored by the counter as a binary difference signal. A digital-/analog converter converts the binary difference between these time intervals into a voltage which represents the total toe angle between the front wheels. The toe angle of the projector-mounting front wheel is obtained in a similar manner by sweeping a rearwardly directed light beam across a fixed roof mirror on the rear wheel that is directly behind said front wheel. In the preferred embodiment, the direction or "sense" of the oscillating light beam is obtained by employing two photocells on opposite sides of a reference line so that the paired cells intercept the beam in one order on an outward sweep and in the opposite order on a return sweep. In a modified embodiment, a single cell replaces the paired cells, and a switch, which is operated by a cam on the motor shaft that swings the mirror, provides signals to a circuit which determines the direction of beam swing.

20 Claims, 52 Drawing Figures

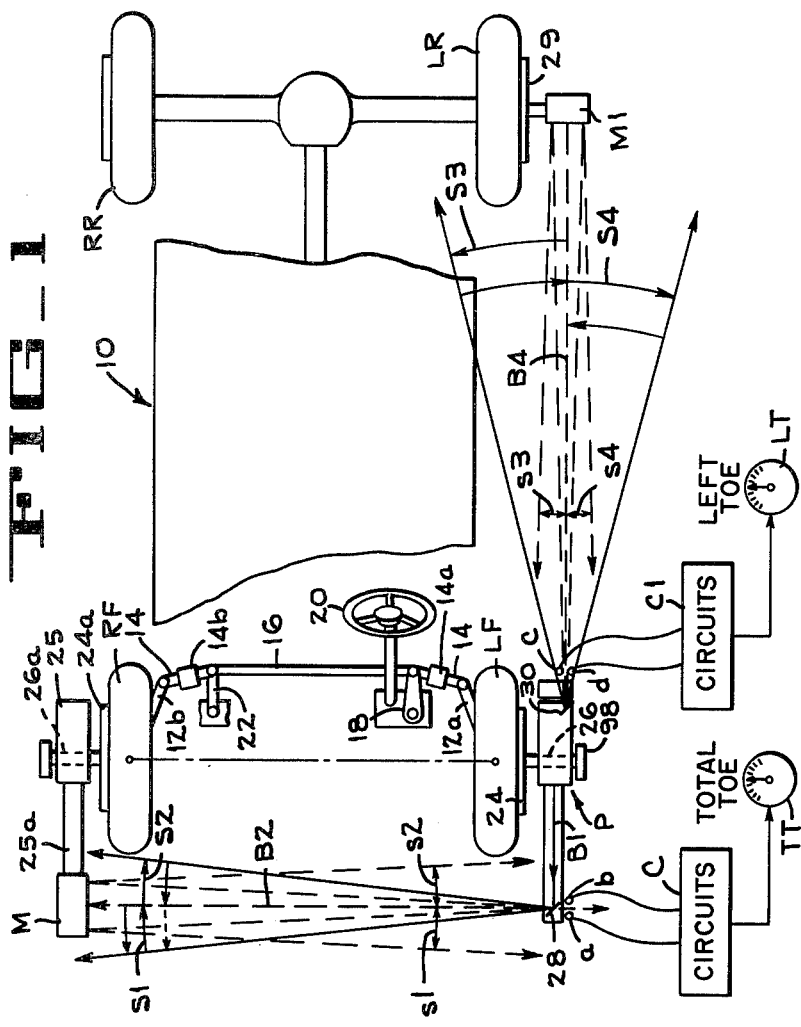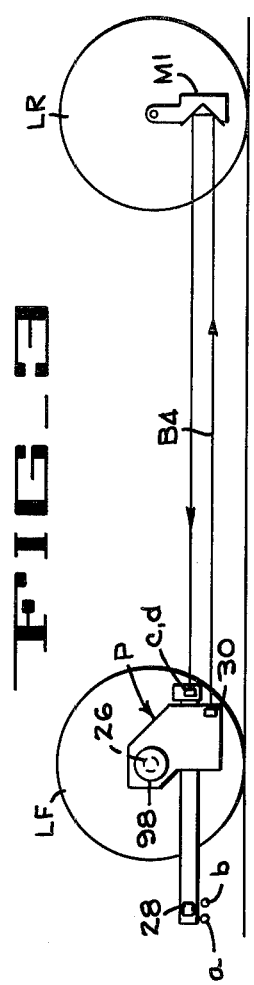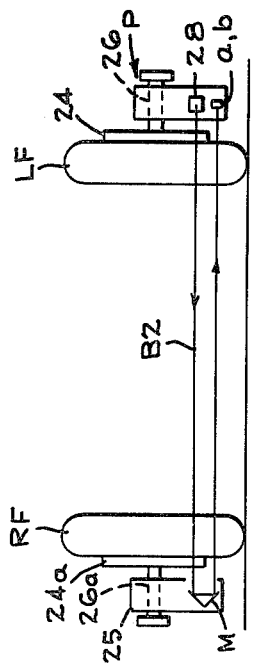

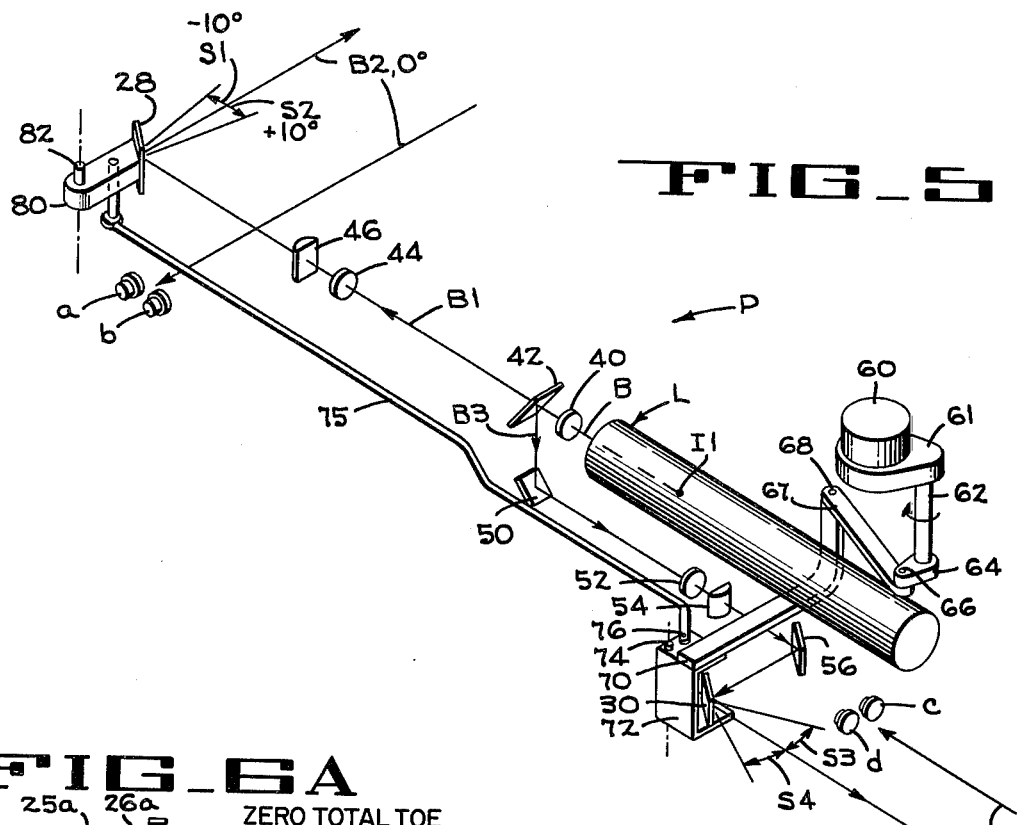
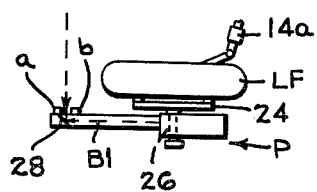
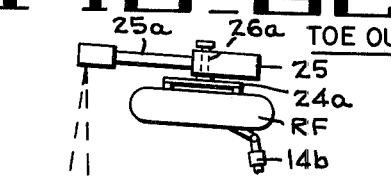
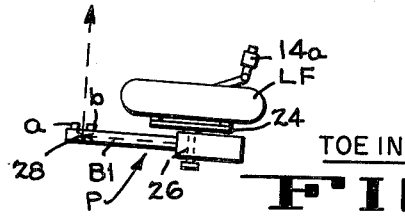

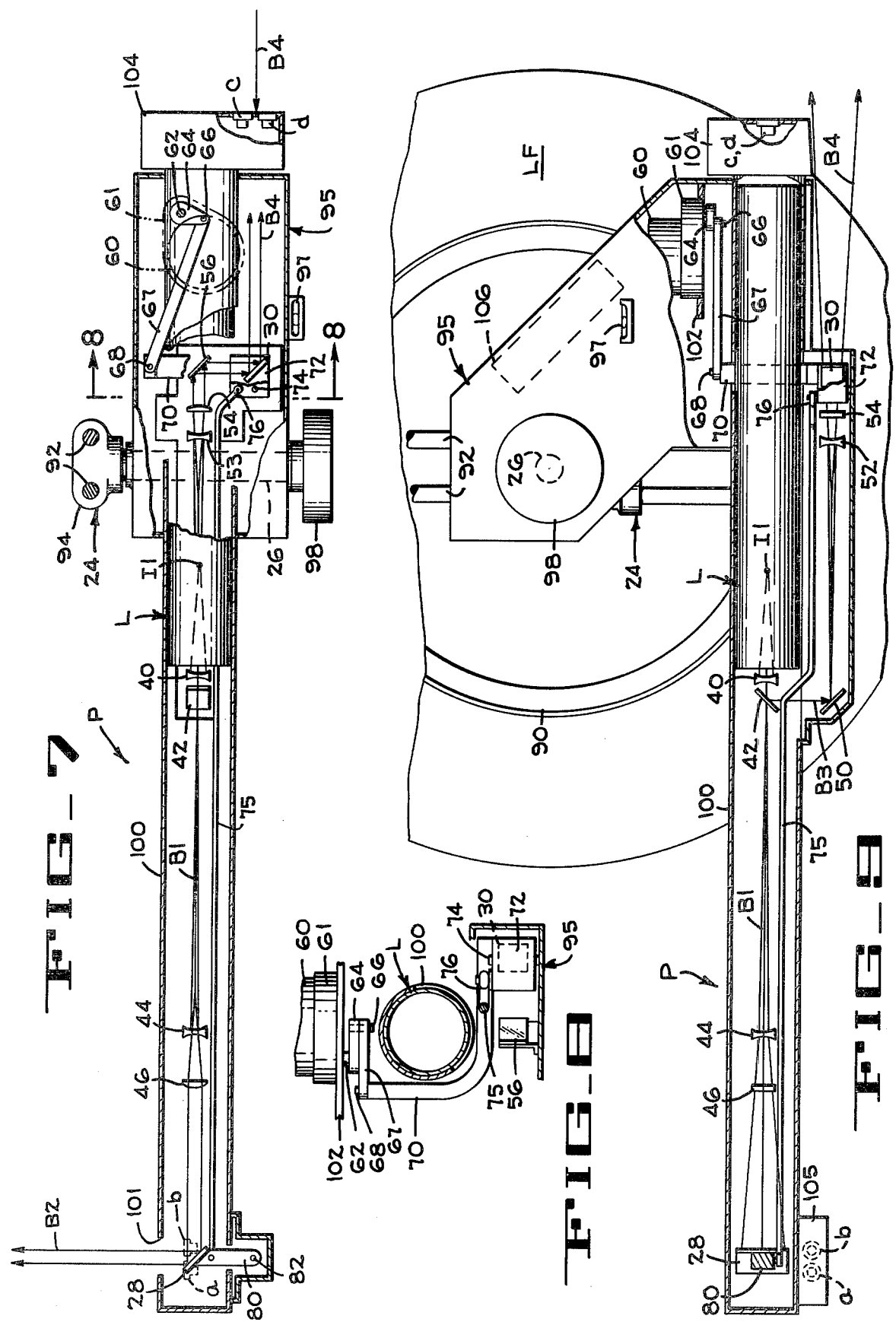

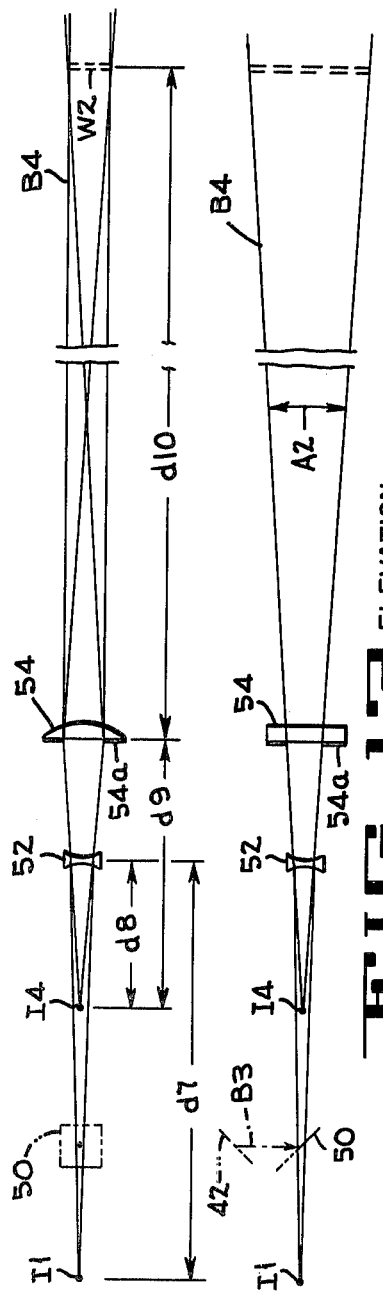
FIG._14 OPTICS EXAMPLE
| LENS | TYPE | FOCAL LENGTH |
|---|---|---|
| 40 | NEG | -35mm |
| 44 | NEG | -25mm |
| 46 | CYL. | +55mm |
| 52 | NEG | -35mm |
| 54 | CYL. | +55mm |
FIG._15
| DIST. | INCHES | mm |
|---|---|---|
| d1 | 1.15 | 29.2 |
| d2 | 8.12 | |
| d3 | 0.89 | |
| d4 | 1.31 | |
| d5 | 2.20 | 55.88 |
| d6 | 160.0 | |
| d7 | 9.03 | |
| d8 | 1.120 | |
| d9 | 2.19 | 55.62 |
| d10 | 232.0 | |
FIG._16 SPREAD ANGLES
A1-10°
A2-6°(MIN.)
FIG._17 BEAM WIDTH
W1-0.12" APP.
W2-0.17" APP.
FIG._10 PLAN CROSSTOE OPTICAL SYSTEM
FIG._11 ELEVATION
FIG._12 PLAN REAR OPTICAL SYSTEM
FIG._13 ELEVATION

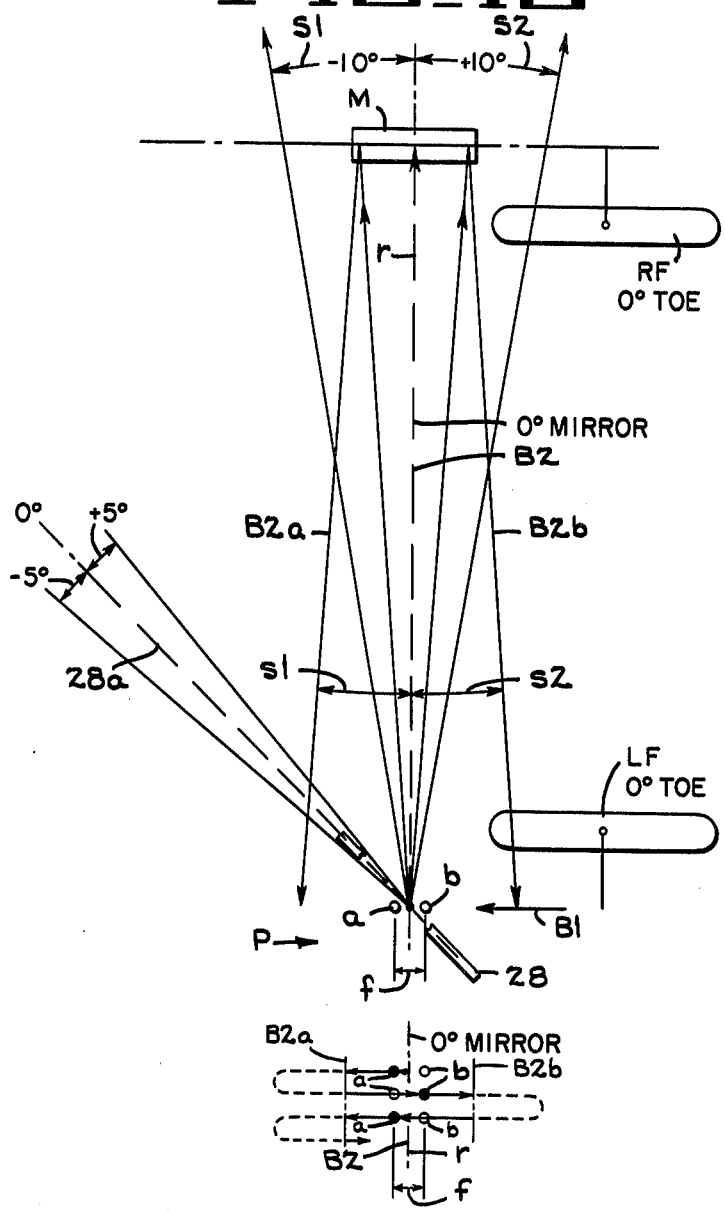
FIG_18
FIG_18A
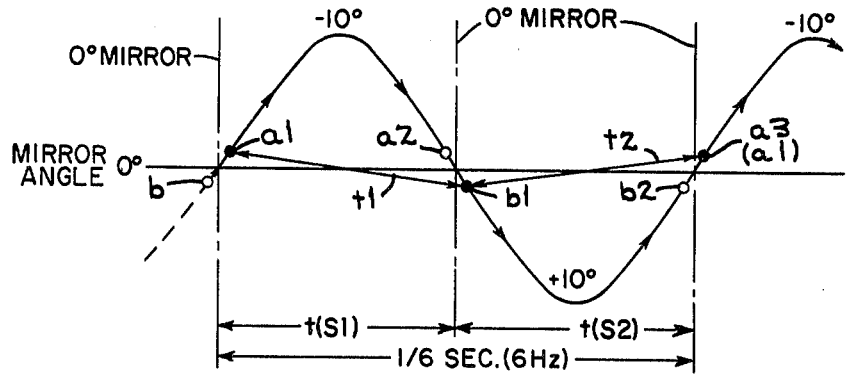
FIG_18B

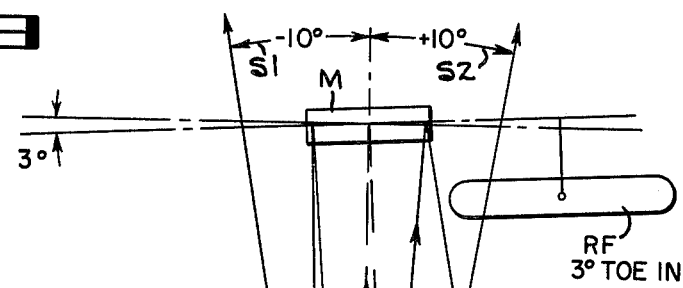
FIG_19
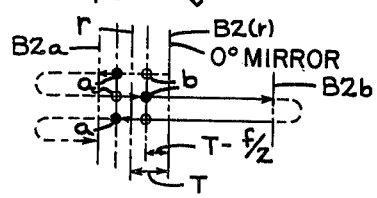
FIG_19A
FIG_19B
FIG_19C
1. $t1 = t(a \to b) = t(a \to a) + t(f)$
2. $t2 = t(b \to a) = t(b \to b) + t(f)$
3. $t2 - t1 = t(b \to b) - t(a \to a)$
4. $t(b \to b) = t(S2) + 2t(T - f/2)$
5. $t(a \to a) = t(S1) - 2t(T + f/2)$
6. $t2 - t1 = 4t(T)$
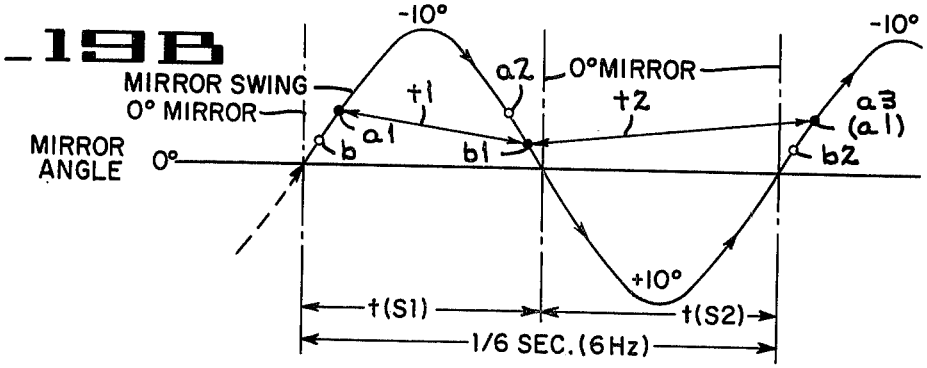

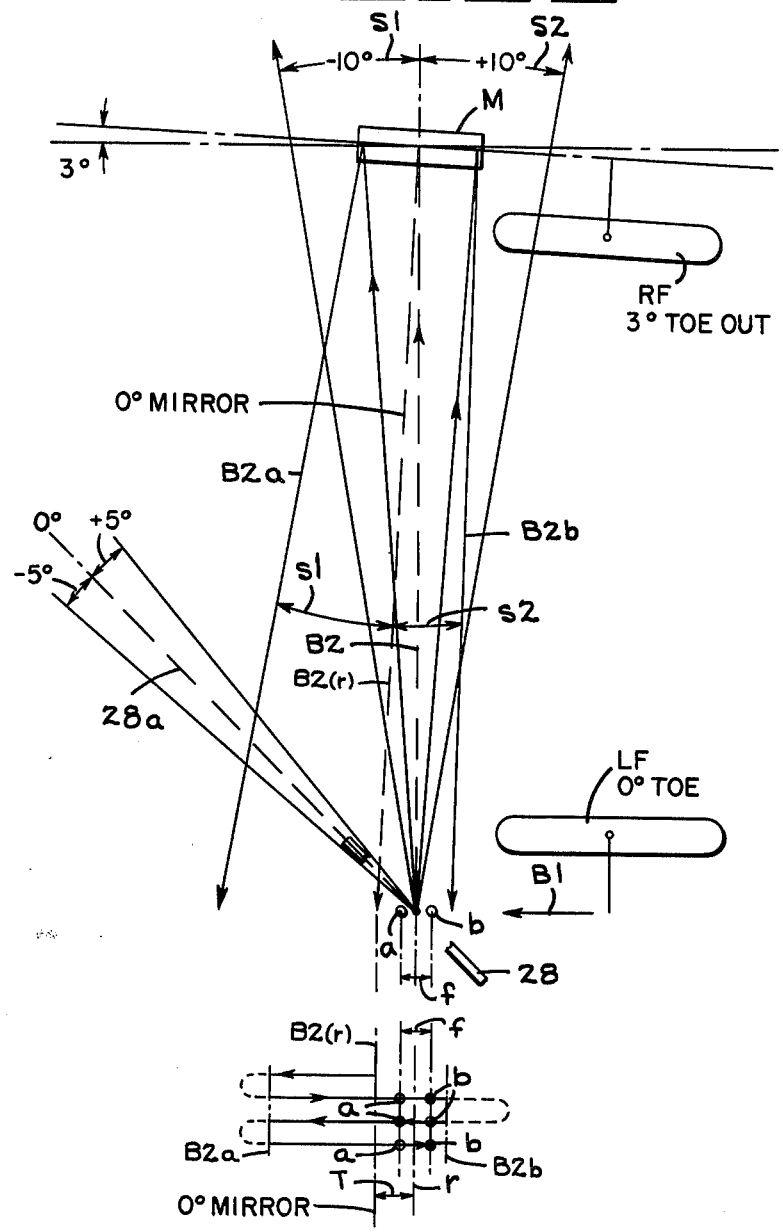
FIG_20
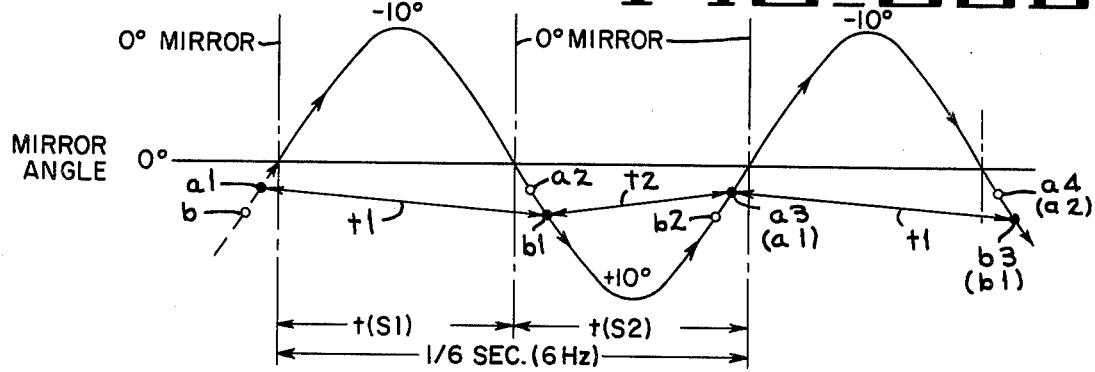
FIG_20A
FIG_20B

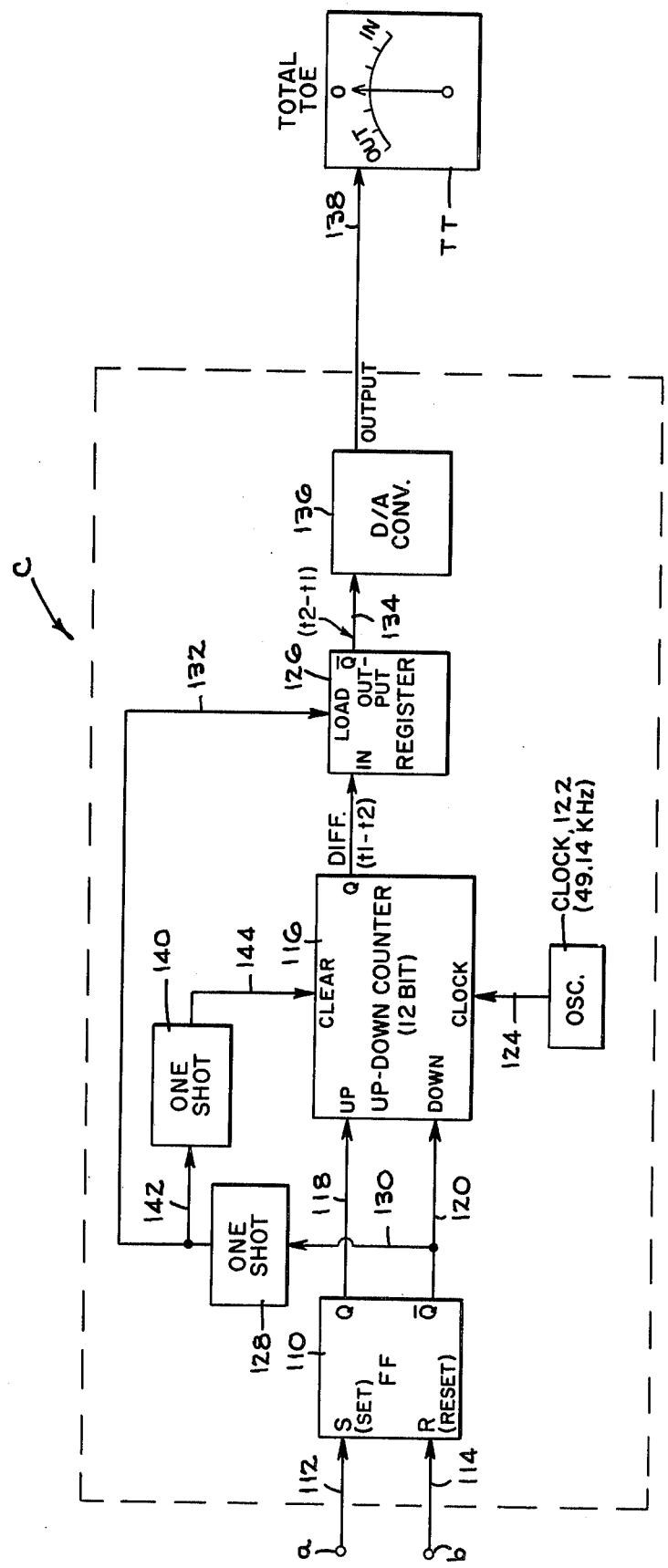

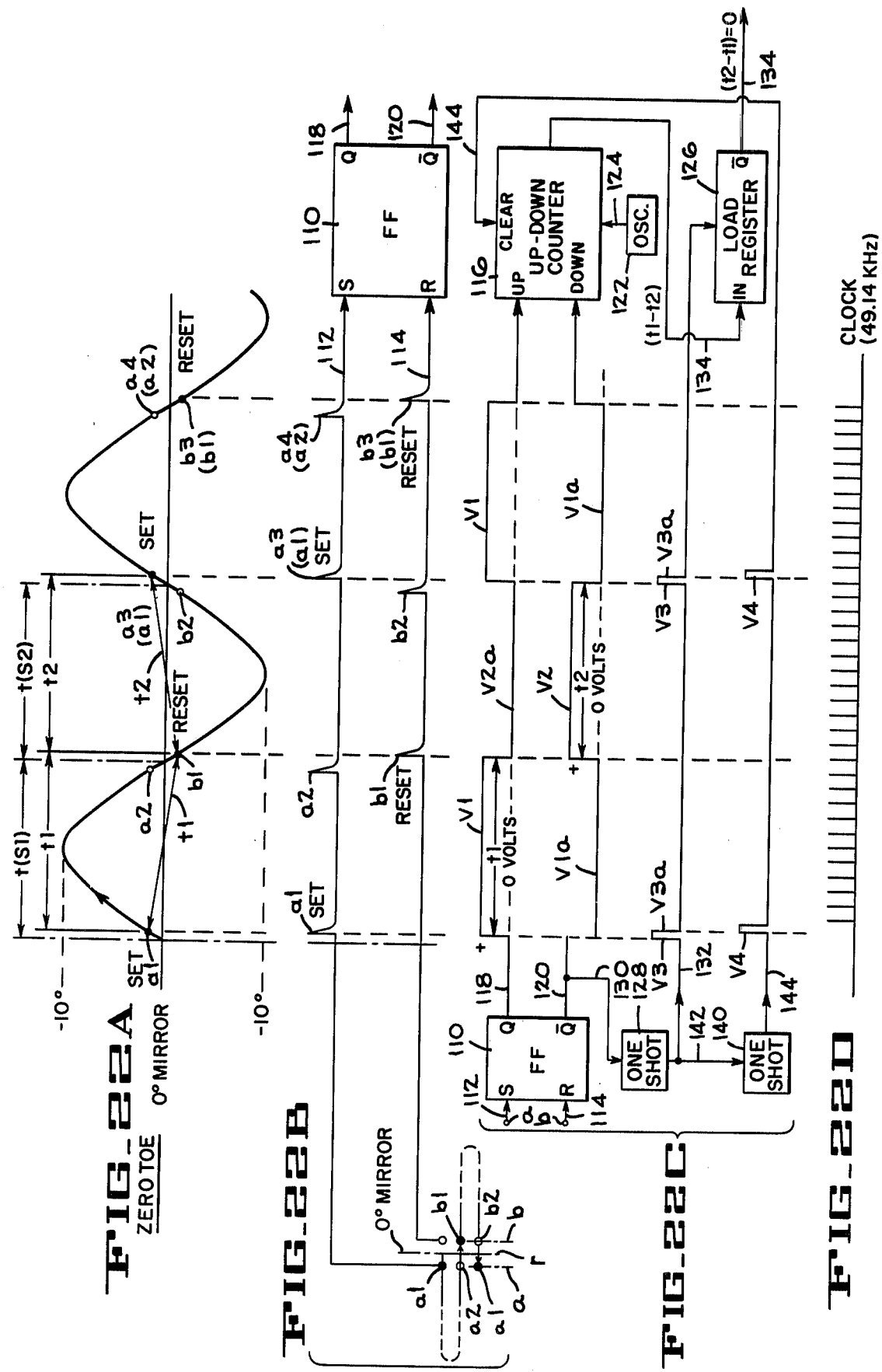

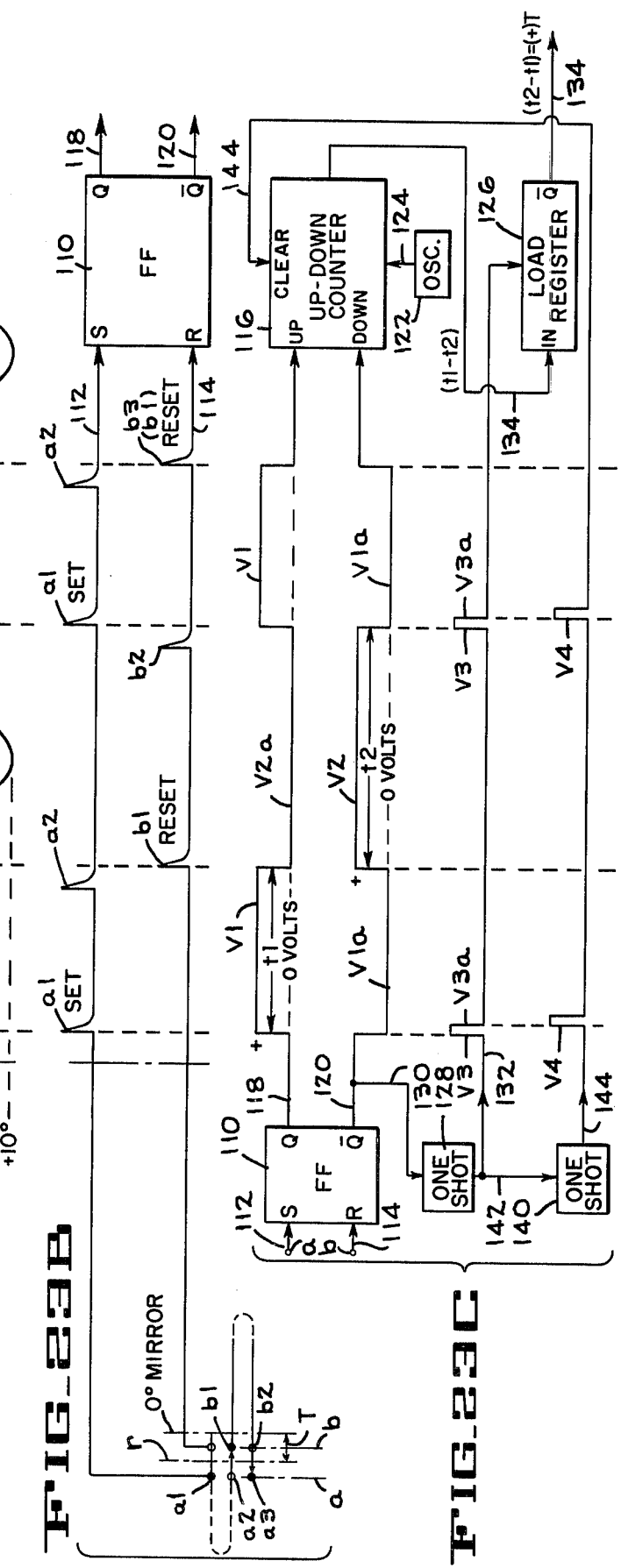

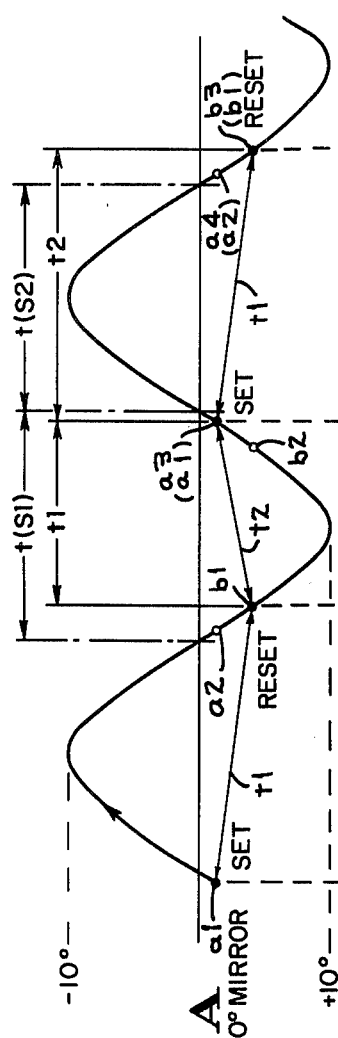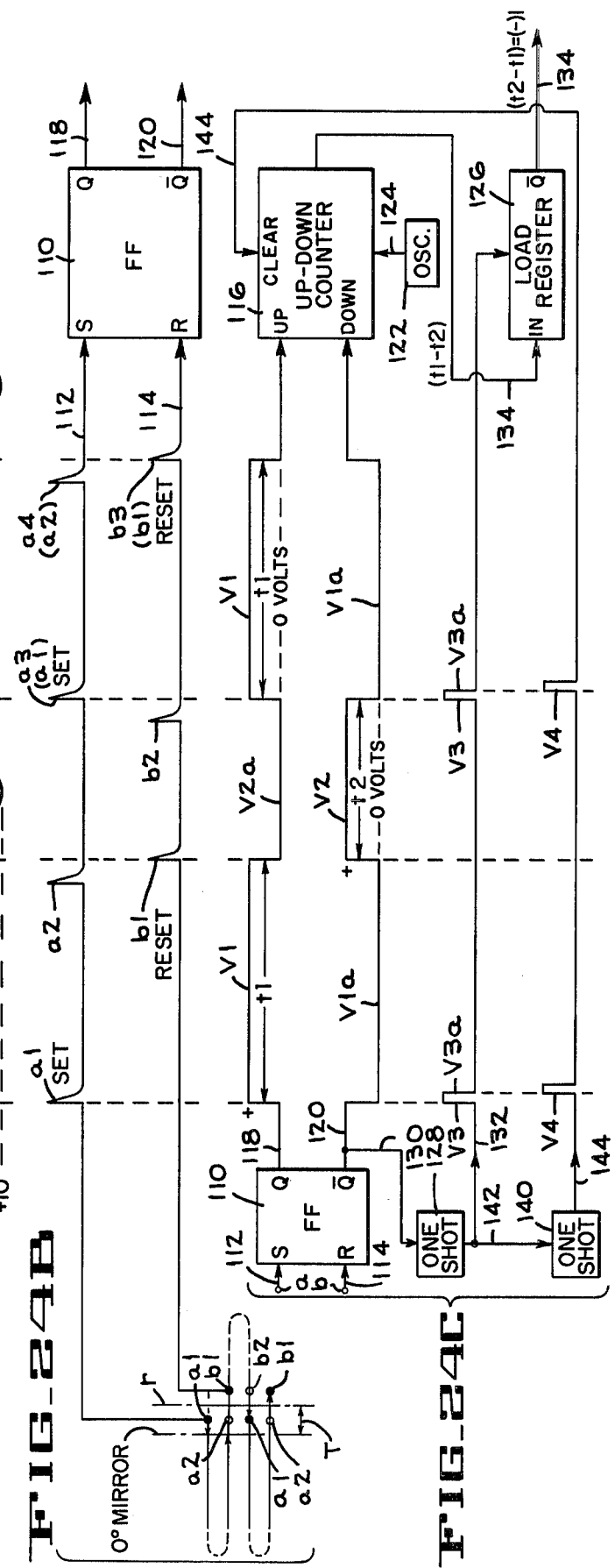
FIG._24A
FIG._24B
FIG._24C
FIG._24D

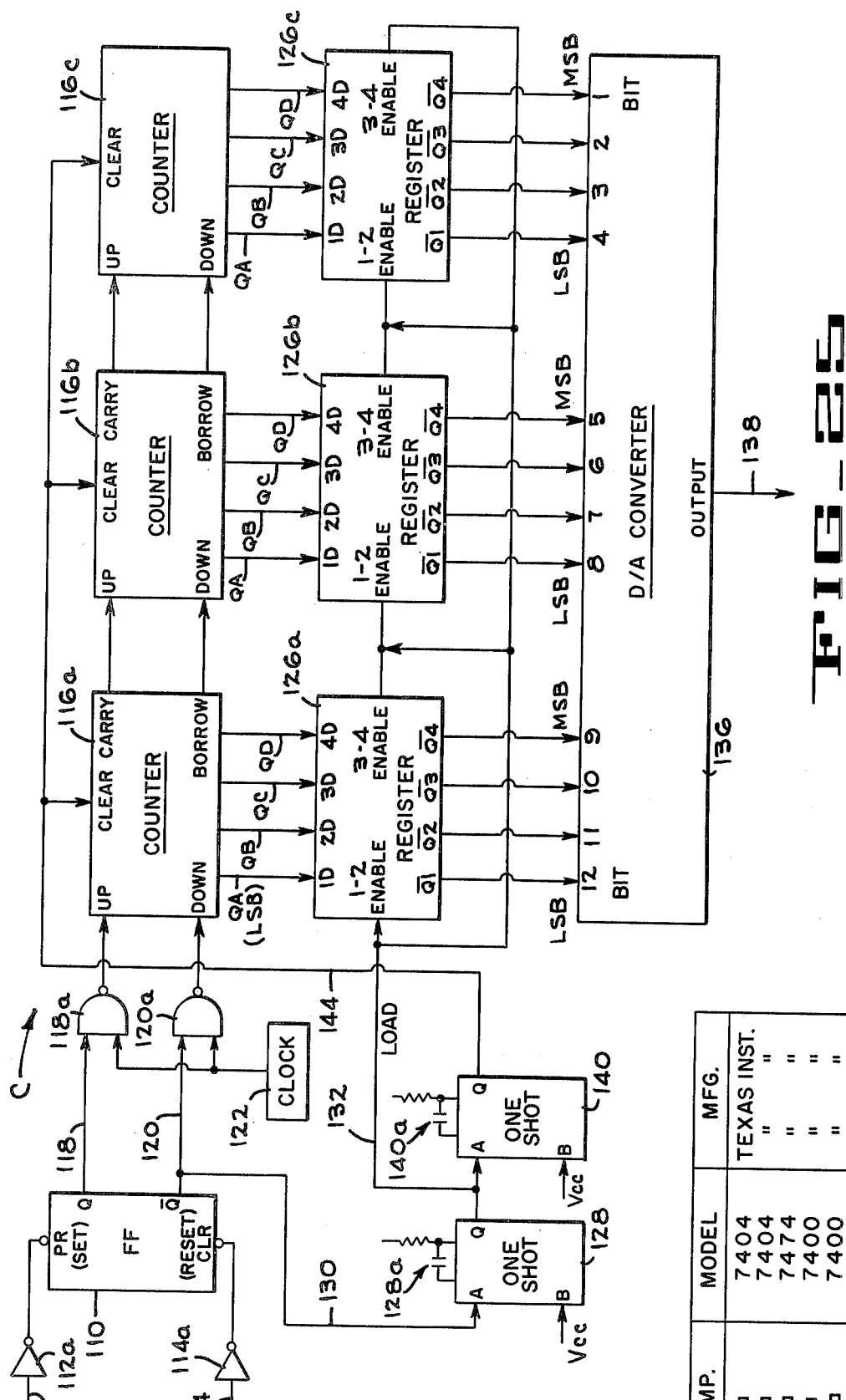
FIG_25
FIG_25A

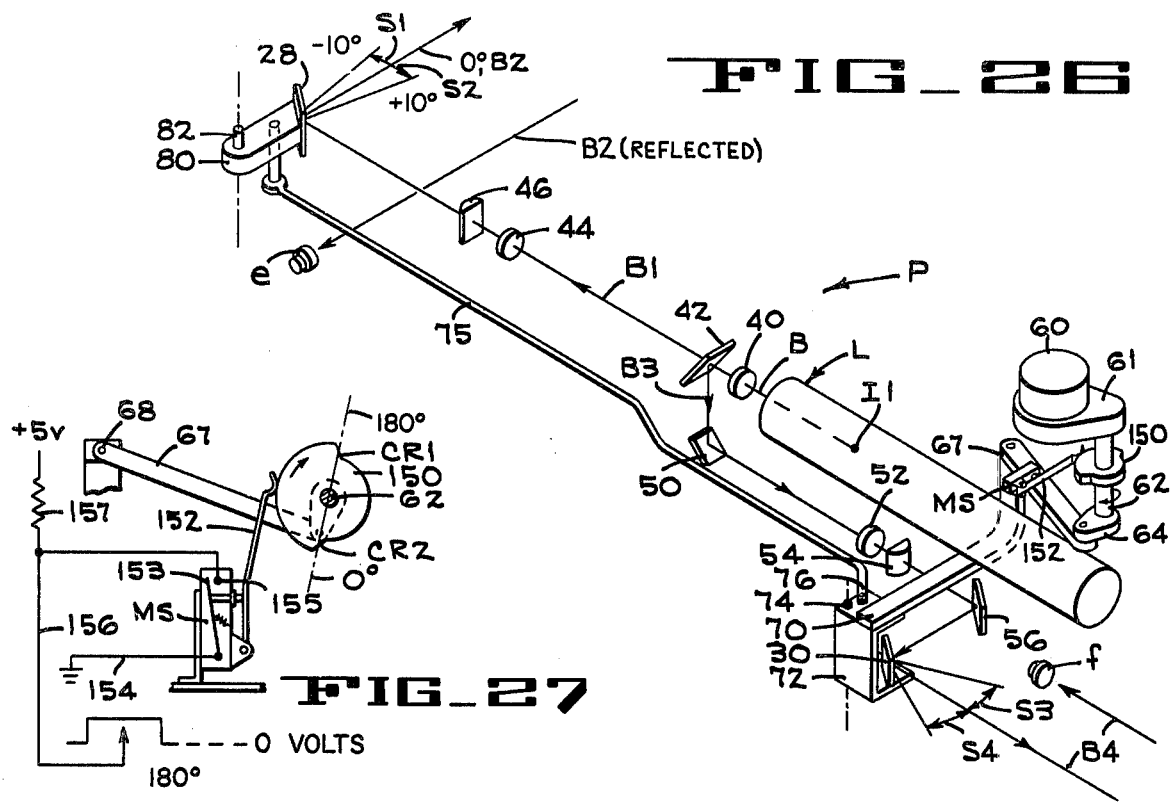
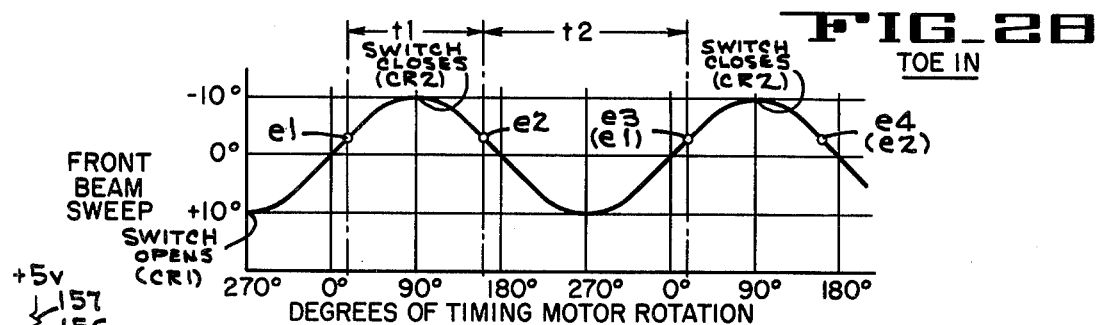
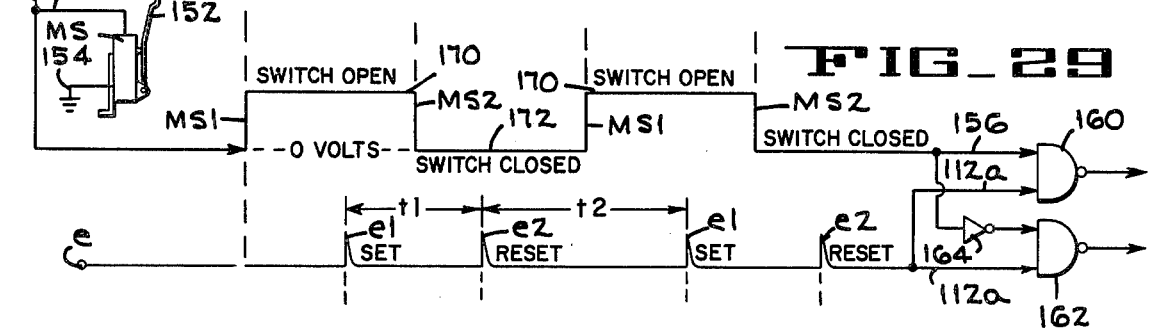
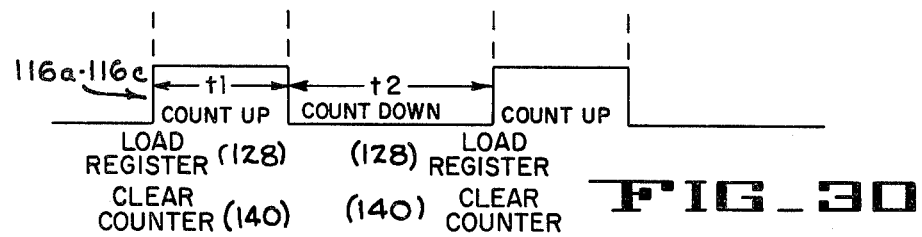

TIME BASE SWEPT-BEAM WHEEL ALIGNING SYSTEM

BACKGROUND OF THE INVENTION

1. Field of the Invention

The present invention pertains to wheel aligning (i.e., wheel alignment measuring) systems, and more particularly, to a system for measuring front wheel toe of the type which includes a wheel mounted projector that provides a mechanically-swept light beam which is intercepted by photo-sensitive means for providing signals that can be employed to indicate wheel toe.

2. Description of the Prior Art

Many prior wheel aligners require accurate positioning of the vehicle relative to a target or the accurate relative positioning of mirrors relative to the vehicle, etc. to provide the relevant wheel alignment data. As will be seen, the wheel aligner of the present invention is of the type wherein all of the data is provided by instruments mounted on the vehicle wheels so that the position of the vehicle relative to its surroundings is immaterial.

The "Angular Position Transducer Apparatus" shown in U.S. Pat. No. 3,782,831 to Senften, issued Jan. 1, 1974, measures separately the individual toe of each front wheel by using a separate projector mounted on each front wheel. In the system described in this patent, taking one front wheel as an example, a light beam projector is mounted on that wheel, and a photocell is incorporated in the projector that is mounted on the other front wheel. The entire light beam projector on said one wheel is mechanically oscillated by a motor driven cam, and the motor simultaneously mechanically rotates a potentiometer which provides a continuously increasing voltage signal that is analogous to the angle through which the beam is swept. The usable, or search angle portion of beam sweep is the sweep, in one direction only, from a reference line through 240° of cam rotation. When the beam, being swept through its search angle, is intercepted by the photocell on the opposite wheel, it has swept in one direction through the angle to be measured, and the corresponding potentiometer voltage is converted by electric circuitry into a toe reading for the wheel upon which the projector is mounted, which reading corresponds to the aforesaid angle measured by the projector.

In order to measure toe of the opposite wheel, a similar projector is mounted on that wheel and a photocell is incorporated in the projector on the first wheel. The second projector measures the individual toe of the wheel upon which it is mounted in the same manner as that previously described. Thus, all of the measuring instruments are wheel mounted in the aforesaid Senften patent; but, in order to measure the toe of both wheels, two oscillating projectors are required (one for each front wheel), and both projectors employ rotating potentiometers as the basic means for developing a voltage which is the analog of wheel toe angle as mechanically measured by the potentiometers.

SUMMARY OF THE INVENTION

As in the aforedescribed Senften system, in the system of the present invention all of the optical and signal generating elements of the aligner are mounted on the vehicle wheels, and hence the measurements are made independently of the vehicle position relative to its surroundings. In the preferred embodiment of the aligning system of the present invention, only a single projector unit is used to measure the total toe angle of the two front wheels. The system can also employ but a single projector to measure the individual toe angle of one of the front wheels. The latter measurement makes it possible to split total toe between the front wheels relative to a reference position of the steering mechanism, if this refinement is desired.

In its broader aspects, the aligner system of the present invention includes an aligner unit incorporating a light beam projector which is mounted on one front wheel, photosensor means associated with a vehicle wheel, means for sweeping the light beam back and forth through a predetermined angle, and circuit means for converting beam intercept signals from the photosensor means into wheel alignment data. The circuit means includes first timing means for measuring the elapsed time between intercept signals when the beam sweeps from the photosensor means and returns back thereto, second timing means for measuring the elapsed time between intercept signals when the beam continues its sweep from the photosensor means and returns back thereto, means for determining the difference between said elapsed times, and means for converting the time difference into wheel alignment data.

In the preferred embodiment, the system measures total front wheel toe and the projector is mounted on one front wheel with the beam being reflected back towards the projector from a mirror mounted on the opposite front wheel. The photosensor means are mounted on the projector for intercepting the reflected beam. In the complete version of the system, the projector also directs an oscillating beam to a mirror mounted on the rear wheel that is directly behind the front wheel that mounts the projector. Second photosensor means at the projector intercepts the reflected rear beam, and the resultant signals provide individual toe angle data for the front wheel that mounts the projector. Preferably, the wheel mounted mirrors are 90° "roof mirrors" in the aforedescribed preferred embodiment. With such mirrors, the reflected beam will always be parallel to the incident beam when viewed in a direction parallel to the intersection of the roof mirrors, and thus, the effects of camber in the front wheels will not prevent the reflected beam from being detected by the photosensor.

In the preferred embodiment of the invention, beams are deflected by front and rear swinging mirrors mounted on the projector. The mirrors are connected by a linkage and driven by a single synchronous motor. A swinging mirror system has less inertia than a swinging projector system, which factor has advantages if the cycle times are short to provide a large number of readings during a test period.

The optical system of the present invention preferably includes means, such as a negative lens followed by a vertical axis cylindrical lens, for providing a beam that is spread vertically but which is narrow horizontally. This effect, coupled with the roof mirror advantages, insures that the reflected beam will be intercepted by the photosensor means at the projector.

Also, in the preferred embodiment of the invention, the photosensor means comprises a pair of closely spaced photocells. The use of two closely spaced photocells in conjunction with the proper circuitry provides signal information which indicates the direction in which the light beam is swinging as it is successively intercepted by the photocells.

In the illustrated embodiment of the invention, the difference between the time required for the beam to sweep in one direction from one of the photocells and back to the other cell and the sweep time from the other photocell back to the first photocell is measured by a circuit which includes a flip-flop connected to the two photocells. The flip-flop makes the aforesaid determination of the direction or "sense" of the sweep, and its output is connected to an up/down binary counter and clock circuit which measures the aforesaid two sweep times and gives their difference as binary information. The time difference binary signals are successively transferred to a register which sends them to a digital-/analog converter for converting the binary time difference information into a voltage which is an analog of wheel toe and which can be displayed on a volt meter, scaled to indicate toe angle.

In the preferred embodiment of the invention, the projector includes a laser for producing a light beam. Other beam sources also could be used with satisfactory results.

BRIEF DESCRIPTION OF THE DRAWINGS

FIG. 1 is a diagrammatic plan view of a vehicle fitted with the system of the present invention for measuring total toe of the front wheels and individual toe of the left front wheel.

FIG. 2 is a diagrammatic front elevation of the apparatus for measuring total toe.

FIG. 3 is a diagrammatic side elevation showing the apparatus for measuring toe of the left front wheel.

FIGS. 4 and 4A are schematic diagrams showing how inclination of a 90° roof mirror in a vertical plane does not change the direction of the reflected light beam.

FIG. 5 is a diagrammatic perspective of the projector of the alignment measuring system of the present invention designed for mounting on a left front vehicle wheel.

FIG. 6A is a schematic plan diagram of the front end of a vehicle showing the path of the front light beam with zero total toe between the front wheels.

FIG. 6B is a diagram like that of FIG. 6A showing the reference, or zero mirror swing angle, position of the front light beam when the front wheels are toed in.

FIG. 6C is a diagram like that of FIGS. 6A and 6B showing the reference, or zero mirror swing angle, position of the front light beam when the front wheels are toed out.

FIG. 7 is a plan of the alignment measuring apparatus shown diagrammatically in FIG. 5 with parts broken away and showing additional details.

FIG. 8 is an enlarged section through the alignment measuring apparatus taken on line 8—8 of FIG. 7.

FIG. 9 is a side elevation of the alignment measuring apparatus with parts broken away and showing part of the wheel upon which the apparatus is mounted.

FIG. 10 is a plan view of the optical system for producing the front beam. It should be noted that the effect of the oscillating front mirror and of the front roof mirror is not illustrated in this and other optical diagrams because they merely change beam direction and not its characteristics.

FIG. 11 is an elevational view of the optical system for producing the front beam.

FIG. 12 is a plan view of the optical system for producing the rearwardly directed beam with the effects of the rear oscillating mirror and the rear roof mirror being omitted.

FIG. 13 is an elevational view of the optical system of FIG. 12.

FIG. 14 is a table giving an example of the optics employed in the optical systems shown in FIGS. 10-13.

FIG. 15 is a table giving an example of the distances between the elements of the optical systems shown in FIGS. 10-13.

FIG. 16 is a table showing the spread angles of the optical systems shown in FIGS. 10-13.

FIG. 17 is a table showing the beam widths provided by the optical systems shown in FIGS. 10-13.

FIG. 18 is a ray tracing diagram in plan showing the action of the front swinging beam with zero toe of both front wheels.

FIG. 18A is a schematic diagram showing the swinging path of the beam of FIG. 18 as viewed from the photocells.

FIG. 18B is a time-based diagram showing the oscillation of the beam of FIG. 18 as the front mirror swings out and in on opposite sides of a zero mirror reference line.

FIG. 19 is a ray tracing diagram of the front beam like that of FIG. 18 but showing an alignment condition wherein there is 3° toe in of the right front wheel.

FIG. 19A is a schematic diagram like that of FIG. 18A showing the path of the beam of FIG. 19 as viewed from the photocells.

FIG. 19B is a time-based diagram like that of FIG. 18B but showing the oscillation of the beam of FIG. 19.

FIG. 19C is a series of six equations which demonstrate how the sweep times from one photocell to the other cancel out whereby the sweep time difference is proportional to the total toe angle of the wheels.

FIG. 20 is a ray tracing diagram of the front beam like that of FIGS. 18 and 19 but showing an alignment condition wherein the right front wheel is toed out by 3°.

FIG. 20A is a front beam sweep diagram like that of FIGS. 18A and 18B but showing the path of the beam of FIG. 20.

FIG. 20B is a time-based diagram like that of FIGS. 18B and 19B but showing the oscillation of the beam of FIG. 20.

FIG. 21 is a simplified schematic diagram of a circuit connected to the photocells for displaying total toe of the front wheels.

FIG. 22A is a time-based diagram like that of FIG. 18B under zero toe conditions.

FIG. 22B is a timing diagram referenced to the diagram of FIG. 22A showing the photocell pulses produced and entering the flip-flop of the circuitry of FIG. 21.

FIG. 22C is a timing diagram referenced to the diagrams of FIGS. 22A and 22B and showing the elapsed time pulses and the register loading and counter clearing pulses produced by the FIG. 21 circuitry.

FIG. 22D is a schematic timing diagram referenced to the diagrams of FIGS. 22A-22C and showing the clock pulses for the counter.

FIGS. 23A-23D are diagrams corresponding to those of FIGS. 22A-22D except that they are representative of a condition where there is toe in, such as shown in FIG. 19.

FIGS. 24A-24D are diagrams like FIGS. 22A-22D except that they are representative of a condition wherein there is toe out, such as shown in FIG. 20.

FIG. 25 is a circuit diagram of a circuit like that of FIG. 21 but showing a specific embodiment of the invention wherein the circuit employs conventional off-the-shelf components.

FIG. 25A is a table of the components employed in the circuit of FIG. 25.

FIG. 26 is a diagrammatic perspective like FIG. 5 but showing a modified form of the invention employing single photocells and a cam-operated switch.

FIG. 27 is a plan view of the cam and switch of the embodiment of the invention illustrated in FIG. 26, showing the internal switch contacts opened.

FIG. 28 is a time-based diagram like that of FIG. 23A illustrating a toe in condition, said time-based diagram being for the modified form of the invention shown in FIG. 26.

FIG. 29 is a pulse diagram referenced to the time-based diagram of FIG. 28 and showing the switch and photocell pulses.

FIG. 30 is a timing diagram referenced to the diagrams of FIGS. 28 and 29 and showing count-up and count-down time intervals and indicating register loading and counter clearing positions.

DESCRIPTION OF THE PREFERRED EMBODIMENTS

General Arrangement

Figures 31, 32:
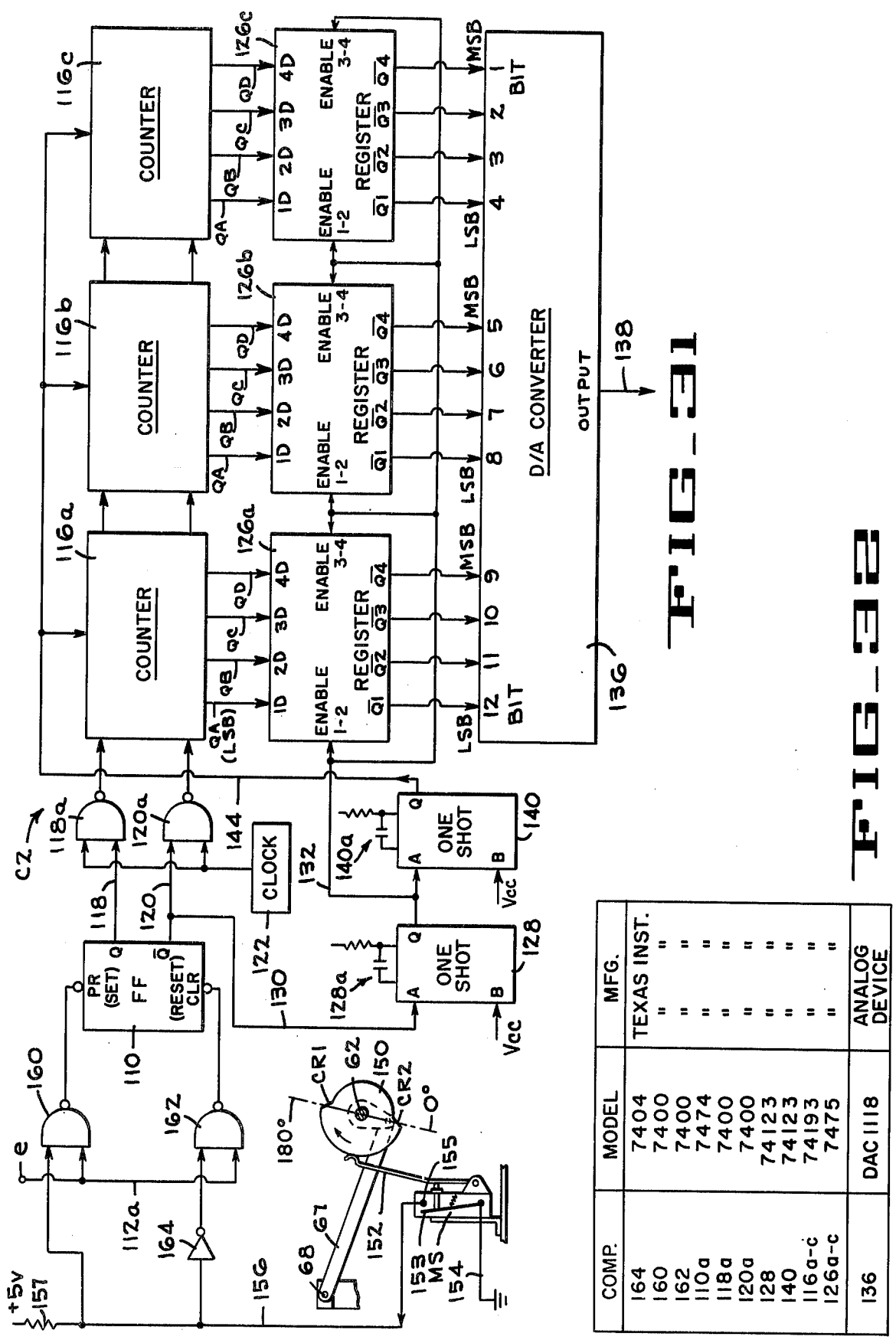
FIG. 31 is a circuit diagram for the modified form of the invention shown in FIG. 26 using commercially available components.
FIG. 32 is a table listing the components employed in the circuit of FIG. 26.

FIGS. 1-3 illustrate in schematic form the general arrangement of the wheel alignment measuring system of the present invention. A wheeled vehicle, such as an automobile 10, is illustrated in highly diagrammatic form and only those elements of interest relative to the system of the present invention are shown. The vehicle has the usual chassis with left and right front wheels LF, RF and left and right wheels, LR, RR. For purposes of illustration, one form of steering and toe adjusting mechanism is illustrated diagrammatically in FIG. 1, it being understood that the present invention is not limited to the use of any particular steering mechanism and adjustment thereof. According to FIG. 1, the left and right front wheels LF, RF have conventional steering arms 12a, 12b connected in a conventional manner to the wheel spindles. Means are provided for steering the wheels in accordance with the principles of the Ackerman steering system universally employed on such vehicles. In the steering system shown in FIG. 1, the wheel steering arms 12a, 12b each pivotally connect to short links 14 having length adjustments 14a, 14b. The links 14 are pivotally connected by a cross tie-rod 16. The wheels are steered by the pitman arm 18 of the steering box under control of the steering wheel 20. An idler link 22 is pivoted to the frame for location of the end of the tie-rod 16 that is opposite the pitman arm 18. With this construction, the individual toe of each of the front wheels can be adjusted to obtain a total toe angle which is split between the wheels when the steering linkage is geometrically centered.

Under the present invention, a projector P that projects oscillating light beams is mounted on one of the front wheels, such as the left front wheel as shown in FIG. 1. The projector P is clamped to the rim of the left front wheel by a mounting mechanism indicated generally at 24. Such mounting mechanisms are well known in the prior art, and a typical example is illustrated in the U.S. Pat. to Graham No. 3,709,451, issued Jan. 9, 1973. The mounting mechanism 24 has a stub shaft 26 which is generally coaxial with the spindle axis of the wheel for pivotally mounting the projector housing. The right front wheel has a mirror mounting mechanism 24a like the mounting mechanism 24 for the left wheel. A body 25 having a mirror arm 25a projecting therefrom is pendulously mounted on a stub shaft 26a of the mechanism 24a, said shaft being generally coaxial with the spindle of the right wheel. The arm 25a mounts a front roof mirror M.

Total Toe Measurement

Referring now to the structure for measuring total toe between the two front wheels and FIGS. 1-3, the projector P has a laser light source (to be described presently) that produces a forwardly directed beam B1 which is perpendicular to the stub shaft 26 and (generally) the axis of the wheel spindle. Mounted at the front of the projector P is an oscillating, or swinging, mirror 28 which at its zero, or reference, mirror angle is at 45° to the beam B1 and hence projects a beam B2 at a 90° angle to beam B1 (at 0° mirror angle) across to the roof mirror M on the right front wheel RF. As will be seen, the position of the beam B2 at the zero mirror angle of the swinging mirror 28 is a reference position and if there is no front wheel toe, the mirror M will reflect the beam B2 back upon itself as viewed from above, and the reflected beam will pass midway between closely spaced photocells a, b mounted on the projector P in a position to receive the reflected beam. The roof mirror reflection of reference beam B2 is best seen in the front view of the vehicle shown in FIG. 2.

As will be seen, the only conditions wherein the reference beam B2 (at zero degrees mirror swing) will be projected back upon itself are those under which the total toe of the front wheels is zero. In order to measure total toe between the front wheels, the mirror 28 is mechanically oscillated back and forth through an angle of five degrees in both directions from the zero angle in the embodiment illustrated. This causes the projected beam to swing out through an angle S1 of 10° to one side of the reference, or zero angle, line B2 and back through the angle S1 to the line B2. The beam then continues to sweep through an angle S2 of 10° in the opposite direction and back to the reference line B2. During a portion of the aforesaid overall sweep angles S1, S2 of the beam, the beam is intercepted and reflected by the roof mirror M, and this reflected sweep of the beam during oscillation of the mirror 28 to either side of the reference line and back is indicated by the angles s1, s2. Some time during the latter sweep angles, the reflected beam is successively intercepted by the photosensor, or photocell, a and is then successively intercepted by the photosensor, or photocell, b. As is well known, assuming that the mirror 28 is generally oscillated about the point at which the beam strikes it, a plus or minus 5° oscillation of the mirror 28 will produce a plus or minus 10° sweep S1, S2 of the projected beam. Thus in the description that follows, it is to be understood that reference to the plus or minus mirror oscillation incorporates reference to the plus or minus 10° sweeps S1 and S2. The signals from the photosensors a, b produced by the beam interceptions are connected to circuit C, which will be described presently, to provide a reading for total toe between the two front wheels on a meter TT.

Left Wheel Toe Measurement

The system of the present invention also provides for measuring individual toe of the front wheel on which the projector P is mounted, in this case, the left front wheel LF. This refinement, in connection with the system just described for measuring total toe between the two front wheels, makes it possible to split the total toe so that each front wheel has one half of the specified total toe when the steering mechanism is centered. The advantage of this mode of adjustment is that in cars wherein the steering wheel has a built-in straight ahead position, the toe of each of the front wheels will be equal when the steering wheel is held at that position. Otherwise, in order to steer the vehicle straight ahead, the steering wheel will not be exactly at the straight ahead position which the driver prefers. The only other significance of this, and it is minor, is that the minimum backlash in certain steering gear typically is provided at the central point in its travel and it is desirable to operate in that minimum backlash condition when driving on a straight road.

In order to measure individual toe of the left front wheel in the example being given, a rear roof mirror M1 is mounted by conventional rim mounting means 29 on the left rear wheel LR. The projector P has a rear oscillating mirror 30 which projects a beam B4. When the mirror 30 is at its zero swing angle and when the left front wheel is at zero toe, the beam B4 can be said to be at the reference position. The mirror oscillating mechanism, to be described presently, swings the beam from the mirror 30 through swing angles S3, S4 of 25° to either side of the reference line, and, during a portion of the entire swing, the beams are reflected by the roof mirror M1 and the reflected beam swings about the reference line through swing angles s3, s4. As in the case of the front wheels, if the left front wheel is at zero toe, at zero mirror angle the beam B4 will be reflected back upon itself as viewed from above and will pass midway between two rear photocells c, d.

During operation, the swinging reflected beam B4 is first intercepted by one photocell, such as photocell c on the outward swing angle S3 and is reintercepted by that photocell on the return swing angle S3. As the swing continues, the reflected beam continues on past photocell c until intercepted by the other photocell d. The outward swing angle S4 follows, and the reflected beam is again intercepted by the cell d on the return swing. The signals from the interception of these beams go to another set of circuits C1, similar to the circuits C for measuring total toe, which circuits C1 provide a reading for the individual toe of the left front wheel LF on a left toe meter LT.

Roof Mirror Advantages

It has been mentioned that the mirrors M and M1 are 90° roof mirrors. FIGS. 4 and 4A illustrate one of the advantages of employing the roof mirror M on the right front wheel RF. In FIG. 4 the two reflecting surfaces of the roof mirror M are disposed so that these surfaces are exactly 45° to a vertical plane v—v and the incident beam B2 is horizontal. Under these conditions, the reflected beam B2 will be parallel to but vertically displaced from the incident beam B2, as seen in FIG. 4.

In FIG. 4A, the reflecting surfaces of mirror M are not exactly at 45° to the vertical v—v. It is a property of such mirrors that the incident and reflected beams will remain parallel. Thus, as shown in FIG. 4A, the reflected beam is also in a horizontal plane. The same parallel reflection results are attained if the incident beam is not perpendicular to the line v—v. The characteristic of the roof mirror which vertically offsets the reflected beam while maintaining the incident and reflected beams parallel facilitates placement of the photosensors a, b, c, d when one or both front wheels have camber. The resulting inclination of the fixed mirror M, or of the swinging mirror 28, does not result in a spreading or divergence of the incident and reflected beams. A similar advantage is obtained by forming the rear mirror M1 as a roof mirror in that the precise position of the mirror about the axis of its mounting rod 29 is not critical. The vertical offset of the incident and reflected beams has another advantage in facilitating offsetting the photocells vertically from the oscillating mirrors to avoid interference of a photocell with the beams from mirrors 28, 30. Also, as will be seen, the beams are spread in the vertical plane by the optics to further remove criticality of beam position in the vertical plane.

Basic Projector Design

FIG. 5 is a diagrammatic perspective view of the basic elements of the aligner or projector P. Additional details of the projector construction will be described in connection with FIGS. 7-9, and the optical system will be described in connection with diagrammatic FIGS. 10-13.

Referring back to FIG. 5, in the preferred embodiment, a laser beam is generated by a laser unit L, which beam is perpendicular to the wheel spindle axis. The initial beam B passes through a negative lens 40 having a virtual image point I1. The spread beam continues on to a half silvered mirror or other beam splitter 42 disposed at 45° to the axis of the beam B. A portion B1 of the beam B passes through the beam splitter, passes through a second negative lens 44, which additionally spreads the beam, and continues on through a vertical axis cylindrical lens 46, which narrows the beam horizontally while it remains spread in the vertical direction. The beam B1 continues on until it strikes the swinging mirror 28. This mirror, as previously described, swings the outgoing beam B2 ten degrees back and forth on either side of a zero reference position.

In order to provide the rearwardly projecting beam B4 for measuring individual toe of the left front wheel upon which the projector P is mounted, a portion B3 of the beam B is reflected from the beam splitter 42 downwardly to a 45° fixed mirror 50. Here, the beam B3 is turned 90° and is projected horizontally rearwardly through a negative lens 52 and on to a vertical axis cylindrical lens 54 which narrows the beam horizontally, as in the case of the front beam B1. The beam B3 continues on from the cylindrical lens 54 and is reflected from a 45° fixed mirror 56 which directs it at an angle of 90° in the horizontal. Beam B3 is reflected as beam B4 by the rear swinging mirror 30, previously mentioned, which directs the beam rearwardly. When the rear swinging mirror is at its zero degree swing angle, or reference position, the beam B4 is reflected back upon itself (although offset vertically) by the rear roof mirror M1, as previously described, and passes midway between the rear photocells c, d which are mounted above the mirror 30, as seen in FIG. 3.

Mechanism to simultaneously oscillate the front mirror 28 and the rear mirror 30 is also illustrated diagrammatically in FIG. 5. The mirrors are oscillated by a synchronous electric A.C. motor 60 through a gear box 61 having a rotary motor output shaft 62. The shaft 62 mounts a crank arm 64 which is pivoted at 66 to a link 67. The other end of the link 67 is pivoted at 68 to one end of an oscillating arm 70, this arm being L-shaped in order to clear the laser beam projector L. The outer end of the arm 70 is secured to a C-shaped bracket 72 which is pivoted to the housing (not shown) at 74. The oscillating rear mirror 30 is fixed on the bracket 72 at an angle of 45° to the incident beam B3 when the bracket is in its centered position. In order to oscillate the front swinging mirror 28, a long, rod-like link 75 is pivoted at its inner end 76 to the bracket 72 and at its outer end to an arm 80 that mounts the oscillating front mirror 28. The arm 80 is pivoted at 82 to the housing of the projector (not shown). Thus, as the motor shaft 62 rotates, the linkage is such that the two mirrors 28, 30 swing through their respective swing angles to generate reflected beams B2 and B4 at swing angles S1, S2 and S3, S4, respectively, as previously mentioned.

Zero Mirror Angle Beam For Various Toe Conditions

FIGS. 6A–6C are schematic plan diagrams of the front vehicle wheels LF, RF showing the projected beam B2 at zero degress mirror angle of mirror 28 for various wheel toe conditions.

Zero Total Toe

FIG. 6A is a plan diagram wherein there is zero total toe, meaning that the spindles of the two front wheels are in the same vertical plane. It is to be understood in the discussions that follow that the result of the condition known as "runout" are not included. Runout occurs when the rim of the front wheel that mounts the projector or the roof mirror is not exactly perpendicular to the wheel spindle or the mounting fixture is not perpendicular to the wheel spindle so that the projector (or wheel-mounted mirrors) wobble slightly when the wheel is rotating. In the present system, the effects of runout can be eliminated in the manner to be described.

Referring to FIG. 6A, this figure illustrates the reference beam condition for zero total toe. Under these conditions, when the front swinging mirror 28 is at its zero swing angle, which can be referred to as the mirror reference angle, the beam B2 coming from the swinging mirror 28 is reflected back upon itself (except for vertical plane offset) by the roof mirror M on the right front wheel, and the reflected beam B2 passes midway between the photosensors a, b. The manner by which a measurement of zero total toe is obtained by swinging the mirror 28 under these conditions will be described in detail presently.

Toe In

FIG. 6B illustrates a toe in condition of the front wheels. Under these conditions the beam B2 coming from the mirror M at zero degrees mirror angle, is reflected to the right (as seen from projector P) of its zero toe angle position. In the illustration of FIG. 6B, toe in is such that the reflected beam B2 at zero degree mirror angle is displaced enough so that it returns to the right of the photocell b. Such an offset of the reflected beam B2 will occur whether both wheels are toed in, as shown in FIG. 6B, or whether the left front wheel has no toe and the right front wheel has toe in, or vice-versa, or in cases wherein one wheel is toed in but the other wheel is toed out to a lesser degree so that the total toe angle between the wheels would be measured as a toe in condition.

Toe Out

FIG. 6C is a diagram showing both front wheels toed out, and now the reflected beam B2 at zero mirror angle passes to the left of the reference position between the photocells a, b and is, in fact, to the left of cell a. Such an offset condition will occur if the left front wheel has zero toe and the right front wheel is toed out, if the right front wheel has zero toe and the left front wheel is toed out, or if one wheel is toed in but the opposite wheel is toed out through a greater angle.

The system of the present invention measures the displacement or offset, of the reflected beam B2, due to toe, as shown in FIGS. 6B and 6C by swinging the beam back and forth so that it intercepts photocells a, b and utilizing the signals from those photocells with circuitry which produces a signal that is an analog to toe angle. As will be described presently in a modified form of the present invention, a single photocell on the reference line can be utilized within the scope of the invention. Also, if the toe angle of only one wheel is to be measured, such as the toe angle of the wheel mounting the projector without reference to the toe angle of another wheel, the photocells need not be at the projector but can be positioned so as to be directly intercepted by a beam emanating from the swinging mirror 28 or from the swinging mirror 30 previously described. To measure toe of both front wheels with such a system would require a projector on each front wheel. In such a case, if two photocells are employed, when the mirror 28 is at zero swing angle, the beam B2 from the mirror 28 will pass midway between the cells; or, if a single photocell is employed, the beam B2 will intercept that cell.

Detailed Description of the Projector

FIGS. 7–9 illustrate additional details of the projector P, which is diagrammatically shown in FIG. 5. As seen in FIG. 9 the projector is mounted on the rim 90 of the left front wheel LF. The mounting assembly 24, previously mentioned, includes parallel rods 92 which, in turn, are connected to clamps (not seen) that mount the projector on the wheel rim. The details of this mounting assembly are not critical to the present invention, and an assembly like that of the aforesaid Graham Pat. No. 3,709,451 can be utilized. The rods 92 support a bracket 94 which in turn mounts the projector housing or body, indicated generally at 95, by means of the stub shaft 26 which projects from the bracket 94 generally coaxial with the spindle axis of the wheel and which pivotally mounts the projector housing 95. A level 97 can be provided on the projector housing, and the housing is retained on the stub shaft 26 by a hand nut 98 threaded to the stub shaft 26. The housing 95 includes a tubular extension 100, the forward end of which mounts the swinging mirror 28, as seen in FIG. 7. A window 101 is provided in the housing for the reflected beam B2.

The motor 60 and gear case 61 are mounted on a bracket 102 secured to the housing 95 in any suitable manner. The motor shaft 62 rotates at 360 RPM giving a mirror cycle sweep time of 6Hz. In order to maintain the projector P in a horizontal position, it is balanced about the pivot axis 26, and since the tube 100 projects forwardly of the axis a substantial distance, a counterweight 104 is secured to the rear of the housing to balance the projector.

The front photocells a, b, are mounted on a support 105 (FIG. 9) below the swinging mirror 28, and the rear photocells c, d, are mounted at the counterweight 104 above the rearwardly projecting beam B4, as previously shown diagrammatically in FIG. 3.

A power supply unit 106 (FIG. 9) is mounted in the housing 95 for the laser unit L. The mechanism for mechanically oscillating the front mirror 28 and the rear mirror 30 previously described in connection with FIG. 5 also appears in FIGS. 7-9, and a detailed description thereof will not be repeated.

Optical System Details

The optical system for the measurement of toe is diagrammatically shown in the plan and elevational views of FIGS. 10 and 11, and the rear optical system is shown in the plan and elevational views of FIGS. 12 and 13. Since mirrors only change the direction of the light beam without altering its optical characteristics, the effect of any mirrors appearing in these diagrams is not shown and the various beam traces are shown as if the mirrors were absent.

Referring to the front, or cross toe, optical system of FIGS. 10 and 11, the beam B is considered to originate at the image point I1, which is close to the focal point of the negative lens 40. The lens 40 spreads the beam B1 to the second negative lens 44 which constructs the virtual image point I2. The beam B1 is spread by the second negative lens 44 to pass through the vertically disposed cylindrical lens 46, which in plan provides a horizontally narrowed beam having a width W1 at point I3, shown in FIG. 10, at a distance d6 (FIG. 11) from the cylindrical lens. Point I3 will be located at the target (i.e., the photocells a, b). As seen in the elevational view of FIG. 11, the cylindrical lens does not affect the spread of the beam in the vertical plane caused by the negative lens 44, the result being that the narrow beam B1 has a vertical spread through an angle A1. After the beam B1 has been reflected from the swinging mirror 28 it has been given the reference character B2, as seen in FIG. 5. The purpose of the vertical spread of the beam is to insure that the beam will strike the photocells a, b, when it is reflected back from the roof mirror M.

Referring to the rear optical system, the elevation view of FIG. 13 shows the beam B3 coming down from the beam splitter 42 and striking the fixed mirror 50. Again the beam is assumed to have its origin at I1, and it passes through the negative lens 52 having virtual image position I4. Lens 52 spreads the beam to the cylindrical lens 54 which narrows the beam in the horizontal plane to a width W2 at the distance d10, as shown in the plan view of FIG. 12. The width W2 will be assumed to be the beam width at the target, i.e., at the plane of the photocells c, d. As seen in FIG. 13, the negative lens 52 spreads the beam vertically through a spread angle A2. If desired, a mask 46a (FIG. 11) may be provided at the cylindrical lens 46 and a mask 54a (FIG. 13) may be provided at the cylindrical lens 54 to confine the beam within the desired vertical spread limits.

FIG. 14 is a table entitled "Optics Example" which gives the focal length and type of lens for each of the lenses employed in the optical systems of FIGS. 10-13.

FIG. 15 is a table giving the distance between the optical elements illustrated on the various diagrams of FIGS. 10-13.

FIG. 16 is a table giving the spread angles A1 and A2 for the cross toe and rear optical systems of FIGS. 11 and 13.

FIG. 17 is a table giving the beam widths W1 and W2 for the cross toe and rear optical systems of FIGS. 10 and 12. It is to be understood that the optical systems illustrated can be varied but represent the presently preferred embodiment of the invention, and it is also to be understood that the distances given are not drawn to scale in FIGS. 10-13.

Principles of Operation

FIGS. 18-20B are diagrams illustrating the principles of operation of the time-base, swept-beam wheel aligning system of the present invention.

FIG. 18 is a ray tracing diagram like that shown for the front wheels LF, RF in FIG. 1, but on a larger scale. It is assumed, in FIG. 18, that both front wheels are at zero toe angle. The plane of the swinging mirror 28 at zero swing angle is indicated at 28a. With the mirror at zero swing angle, the ray B2 coming from the mirror 28 is reflected by the roof mirror M back upon itself (as viewed from above) and passes midway between the photocells a and b.

As the mirror swinging mechanism swings the front mirror 28 to the −5 degree position, the reflected beam B2 is swept through an angle S1 of −10 degrees from the zero degree reference line r, which coincides with the reflected beam B2 at zero mirror swing angle. As previously mentioned, the beam is then returned to the reference line and swept through an angle S2 of +10 degrees and then back to the reference line. This sweeping action continues as long as desired by the operator, and total toe readings on the meter TT (FIG. 1) are obtained during each complete swing cycle of the mirror, and hence of the beam B2.

During an initial portion of the overall sweep S1, S2, the beam B2 emanating from the mirror 28 is reflected back by the roof mirror M on the right front wheel, after which the beam is no longer intercepted by the mirror. These reflected partial sweep angles are illustrated as s1, s2, and sometime during these sweeps the photocells a, b successively intercept the beam.

FIG. 18A is a sweep diagram which can be said to represent that which would appear if the eye were located at the position of the photocells a, b. For purposes of illustration, the outgoing and returning beam sweeps are spread apart vertically, otherwise the sweep lines would overlap and they could not be illustrated. The solid lines indicate the received reflected beam to its limits B2a and B2b, while the dashed lines indicate the theoretical beam which would be received if the mirror M were long enough to reflect the entire 20° sweep of the beam B2. The distance between the photocells a, b is indicated as f, each photocell being spaced from the reference line by the distance f/2. Each time a photocell intercepts the beam, it produces a pulse, but (as will be seen) only the interceptions which produce significant pulses are shown as solid dots, the non-significant interceptions being shown as small, open circles.

Tracing one mirror cycle (the time equivalent to one revolution of the mirror drive shaft 62 (FIG. 5) in FIG. 18A, it is seen that the light beam B2 emanating from the mirror 28 starts on the reference line r, which is half-way between the photosensors a, b, and (in the case of zero toe) the reference line r coincides with the zero mirror angle position of the reflected beam B2 from the roof mirror M. On its negative sweep, the beam B2 reflected from mirror M sweeps the distance f/2 and is first intercepted by the photosensor a. As indicated, a significant pulse is produced at this interception. As the mirror 28 continues on its negative five degree sweep angle, the reflected beam B2 sweeps on past the sensor a and later starts its return towards the sensor. The reflected beam is then re-intercepted by the photosensor a, but this second successive interception by the sensor a produces no significant pulse. The reflected beam continues its sweep from sensor a, across the sensor spacing f and on until it is first intercepted by the sensor b. The first interception by sensor b produces a significant pulse. The mirror continues on its positive five degree sweep angle as the reflected beam moves past the sensor b and back to it, but the second successive interception of the sensor b produces no significant pulse. The reflected beam then continues in its sweep, across the sensor spacing f and is then intercepted by the sensor a for a third time. The third interception by sensor a again produces a significant pulse.

FIG. 18B is a sinusoidal time-based diagram illustrating the oscillation of the mirror 28, and hence the beam B2 projected therefrom, in terms of an x axis representing time and a vertical axis representing beam sweep angle (S1 and S2). The trace shows the times at which photosensors a, b intercept the reflected beam during one complete cycle of mirror oscillation, and hence, of beam sweeps S1, S2. AS seen in FIG. 18B, the beam B2 is first intercepted by sensor a at time a1, at which time a significant signal pulse is produced. The beam continues on to its limit of −10° (−5 degrees mirror swing) and returns toward the reference line position r. Under conditions of zero toe, as illustrated, the beam B2 is reintercepted by the sensor a at time a2, but this interception produces no significant pulse. After the second beam interception by sensor a, the beam passes the reference line r (0° mirror angle) and is intercepted by sensor b at time b1, which provides a second significant pulse. The beam continues on to its +10° sweep extreme and turns back towards the reference line r, but before reaching that line the beam is again intercepted by the sensor b at time b2, which interception provides no significant pulse. The beam B2 continues on past the reference line and is intercepted by the sensor a at time a3, which graphically corresponds to time a1. This interception at time a3 (a1) again provides a significant signal pulse from the sensor a.

As illustrated in FIG. 18B, in the preferred embodiment, the cycle time for the mirror is 1/6 of a second, or 6 Hz. The time for the beam to perform one complete sweep of −10° is t(S1), and the time for the beam to perform its second complete sweep of +10° is the time t(S2). The time between the first significant pulse at time a1 and the next significant pulse at time b1 is shown as time t1. The time between the aforesaid pulse at time b1 and the next significant pulse from sensor a at time a3 is shown as time t2. As will be seen, the circuitry of the present invention measures the times t1 and t2, takes their difference, and utilizes that difference as a measurement of total front wheel toe. In the case of zero toe, these two times t1 and t2 are equal, and the difference will therefore become zero—indicating zero toe.

FIGS. 19-19B are schematic diagrams illustrating a toe in condition of the front wheels. In the ray tracing diagram of FIG. 19, it is assumed that the left front wheel LF is at zero toe and the right front wheel RF has a toe in of three degrees (for example). This will correspondingly incline the horizontal axis of the roof mirror M mounted on the right front wheel by 3 degrees in the horizontal plane. The sweep angle of the mirror 28 is five degrees on either side of the zero mirror angle line 28a, sweeping the beam through angles S1 and S2 of ±ten degrees, as before. However, due to the 3° inclination of the roof mirror M, the reflected beam B2(r) at the zero mirror angle position 28a of mirror 28 now reaches the plane of the sensors a, b to the right of the sensor b, as shown in FIG. 19. Under the toe in conditions of FIG. 19, the reflected sweep angle s1 out from the zero degree mirror reflected beam position B2(r) to the reflected beam position B2a and back to the beam position B2(r) is now less than the reflected sweep angle s2 from the zero degree mirror reflected beam position B2(r) out to the reflected beam position 32b and back.

FIG. 19A is a diagram, like FIG. 18A, showing successive reflected beam intercepts by the photosensors a, b. As seen in FIG. 19A, the zero mirror angle reference line of reflected beam B2(r) is offset by a distance T from the mechanical reference line r, which bisects the spacing f between the sensors a, b.

Tracing the sweep of the beam in FIG. 19A as before, and starting with the zero degree mirror angle reflected beam position B2(r) on the −5 degree excursion of the mirror 28, the reflected beam is now first intercepted by the sensor b, which under these conditions produces no significant pulse. The reflected beam then sweeps across the sensor spacing f and is intercepted by the sensor a, producing a significant pulse. On the return swing of the mirror from its −5 degree position, the sensor a again intercepts the reflected beam but the pulse thus generated is not significant. As the beam sweep continues, it sweeps across the sensor spacing f, and the reflected beam is again intercepted by the sensor b, which now generates a significant pulse. As the reflected beam continues its sweep it reaches the zero degree mirror angle line of the reflected beam B2(r) (at ½ of the cycle time) and continues on through its maximum reflected sweep position at B2b with no photocells intercepting the beam during this portion of the sweep. The beam is not reflected for a period of time until it returns from its reflected position B2b. The beam then recrosses the zero mirror angle line reflected beam position B2(r) and is intercepted by the sensor b for the second time. This interception produces no significant pulse. The reflected beam then sweeps across space f between the sensors and is intercepted by the sensor a for the third time. This provides a significant pulse for the circuitry C.

FIG. 19B is a sinusoidal time-base diagram like that of FIG. 18B, previously described. It will be noticed that under toe in conditions, the sensors a, b are no longer centered about the zero degree mirror line but are offset therefrom in the −5° mirror swing direction (−10° beam swing).

Starting with the zero degree mirror angle line in FIG. 19B, the reflected beam is first intercepted by the sensor b at time b, but this interception produces no significant pulse. The reflected beam is next intercepted by the sensor a at time a1 which produces a significant pulse. The mirror continues on its swing, and on its return the reflected beam is re-intercepted by the sensor a at time a2, but this second successive interception of sensor a produces no significant pulse. The reflected beam continues on and is intercepted by sensor b at time b1, before the beam reaches the 0° mirror angle position line. This interception by sensor b produces a significant pulse. The reflected beam now returns to the zero degree mirror angle position, and the mirror continues to swing through its +5° sweep. Under toe in conditions, during this complete swing of the beam from the zero degree mirror line and back, the reflected beam is not intercepted by either photocell a or b because they are offset from that side of the sweep path. After recrossing the zero degree mirror angle line, the reflected beam is intercepted by the photosensor b for the second successive time at time b2, which interception produces no significant pulse. The reflected beam is next intercepted for the third time by the sensor a at time a3(a1), which produces a significant pulse.

As indicated in FIG. 19B, the measured times are the time t1 between the first interception time a1 of sensor a and the interception time b1 of sensor b and the time t2 between the interception time b1 and the next interception of sensor a at time a3(a1). It will be noted that in this case the sweep time t1 is shorter than the sweep time t2, and hence, the time difference t2 minus t1 will be positive, which represents a toe in angle between the front wheels.

FIG. 19C is a set of six simple equations which show that the sweep times between the photocells a and b cancels out and that the difference between sweep times t2 minus t1 is four times the time t(T) (equation 6) required for the beam to sweep the distance T between the mechanical reference line r and the zero mirror angle reflected beam position B2(r). This time t(T) is an analog of total toe angle and hence can be used to provide a scaled analog signal of total toe. The variables in the equations of FIG. 19C are as follows:

T—the offset distance of B2(r) from r, an analog of toe angle.
t1—the sweep time required for the beam to sweep from the first significant interception by a to the first significant interception by b.
t(a→b)—this is another symbol for t1.
t(a→a)—the time required for the beam to sweep between two successive interceptions by the sensor a (without an interception by b).
t(f)—the time required for the beam to sweep in one direction across the spacing f between the sensors a, b.
t2—the time required for the beam to sweep from the first significant interception by b back to the next significant interception by a.
t(b→a)—the same as t2.
t(b→b)—the time required for the beam to sweep from sensor b back thereto (without an interception by a).
t(S2)—the time required for the beam B2 to make a full 10° sweep in one direction from zero degree mirror angle and back.
t(S1)—the time requied for the beam B2 to sweep 10° in the opposite direction from the zero degree mirror angle and back.
t(T)—the time required for the beam to sweep in one direction between the mechanical reference line r and the zero mirror angle reflected beam position B2(r).

It will be seen by examining the final equation six of FIG. 19C, that the factor f relating to the spacing between the sensors a, b cancels out, and the difference between the times t2 and t1 is a function of the offset T, which, in turn, depends upon total toe in.

If the left front wheel LF is toed in as well as the right wheel, the total toe offset T will be larger than that just described. If the right front wheel has zero toe and the left front wheel has three degrees toe in (for example) the total toe offset T will be the same as that just described. In other words, it makes no difference whether the mirror M is inclined, or whether the projector P is inclined, or whether both are inclined; if the total toe angle between the two front wheels as measured in accordance with the principles just explained results in a positive difference, that difference will indicate that the wheels are toed in, and the total toe angle between the front wheels will appear on the total toe indicator TT (FIG. 1).

FIGS. 20-20B are diagrams corresponding to FIGS. 19-19B except that FIGS. 20-20B illustrate the condition of toe out of the right front wheel, instead of toe in thereof. Under the present invention, the two conditions are, in a sense, mirror images of one another, and it is not believed necessary to describe the toe out conditions in great detail.

It will first be noted that with the right front wheel toed out by three degrees (for example) the zero mirror angle reflected beam position B2(r) is directed to the left (as viewed from projector P) of sensor a, instead of to the right of sensor b as in the toe in condition of FIG. 19. As a result of the wheel alignment conditions of FIG. 20, and as seen in FIG. 20B, the sweep time t1 (measured from the time a1 when the sensor a first intercepts the reflected beam to the time b1 when the sensor b next intercepts the reflected beam) is greater than the time t2 (measured between the aforesaid interception by the sensor b and the next interception by sensor a at time a3). As a result of the toe out conditions of the front wheels, the difference between the times t2 and t1 is negative, indicating that the toe of the front wheels is in a toe out condition. As before, it makes no difference whether one wheel, or the other, or both wheels are toed out; so long as the total toe angle signal is negative, the total toe reading is one of toe out.

Simplified Circuit Diagram

FIG. 21 is a simplified circuit diagram showing the connection of the photosensors a, b to the circuit C for measuring total toe of the front wheels. Pulses from the photosensor a are connected to the S or "SET" input of a flip-flop 110 by a line 112, and pulses from the sensor b are connected to the R or "RESET" input of the flip-flop by a line 114. In this circuit diagram power sources and ground lines are omitted, these being conventional engineering details.

The Q output of the flip-flop 110 is connected to the "UP" terminal of a 12 bit up/down binary counter 116 by means of a connection 118. The $\bar{Q}$ output of the flip-flop 110 is connected to the "DOWN" input of the counter by a connection 120. When the Q output voltage goes up, the $\bar{Q}$ output voltage goes down, and vice versa.

An oscillator or clock 122, which in the present example provides pulses at 49.14 KHz, is shown diagrammatically as providing timing pulses to the up/down counter 116 by connection 124. When one of the counter functions (up or down) is enabled by the flip-flop 110 the other counter function is suppressed. When either input is enabled, the counter counts in the corresponding direction (up or down) in response to clock time pulses.

The difference between the up and down counts (t1-t2) is shown as being provided at a Q output terminal of the counter 116 and is directed in binary form to the input terminal "IN" of a register 126.

The register 126 is conditioned to be loaded by the binary time difference information (t1-t2) from the output of the counter 116 at the start of each cycle by a one-shot pulse generator 128 connected by a branch line 130 to the $\bar{Q}$ output line 120 of the flip-flop 110. The short pulse from the one-shot 128 is directed by line 132 to the "LOAD" input of the register 126 to enable the register to receive the binary count difference information from the counter 116. The "OUTPUT" connection of the register 126 enters, by means of line 134, the input terminal of a digital/analog converter 136 having its "OUTPUT" terminal connected at 138 to the total toe meter TT. The $\bar{Q}$ output of register 126 provides a binary signal representative of the count difference $t2-t1$.

In the embodiment of the invention being described, the digital/analog converter 136 converts the binary input time difference information received from register 126 into a voltage, which voltage is an analog of that information and which appears on the total toe meter TT. The meter is scaled to convert the voltage into corresponding toe in and toe out angle readings. For example, if the voltage is positive that will represent a total toe in, and the scale of the meter will indicate the corresponding total toe in angle. A negative voltage input to the meter will indicate the corresponding toe out angle.

After the register 126 has been loaded with one cycle (360° of motor shaft 62 rotation) of binary time difference information from the counter 116, the counter is cleared and hence is ready for additional up/down count signals from the flip-flop 110. Clearing of the counter is accomplished by a second one-shot 140 which is activated by a branch line 142 from the output line 132 of the first one-shot 128. The output pulse from the one-shot 140 is connected by a line 144 to the "CLEAR" input of the up/down counter 116. The one-shot arrangement is such that the register 126 is loaded before the counter is cleared, and the total duration of the two one-shot pulses is less than the time interval between successive clock pulses.

Wave Form/Circuit Diagrams

FIGS. 22A-22D, 23A-23D, and 24A-24D are aligned schematic diagrams correlating the information described in connection with FIGS. 18-18B, 19-19B, and 20-20B with the simplified schematic circuit diagram described in connection with FIG. 21 and showing various pulses and their utilization by the circuit C.

Zero Toe

Referring to FIGS. 22A-22D, FIG. 22A corresponds to FIG. 18B previously described. When the reflected beam is first intercepted by the cell a at time a1, a pulse a1 shown in FIG. 22B operates as a set pulse for the S input of the flip-flop 110, the Q output line thereof going positive and the $\bar{Q}$ output line thereof going negative. When the reflected beam is reintercepted by the photocell a at time a2 on its return from its minus five degree sweep of the mirror, a pulse a2 (FIG. 22B) is generated. However, since this pulse also enters the set inputs of the flip-flop 110 and since the latter was previously set, the pulse a2 has no effect on the circuitry.

As the beam continues its sweep, the mirror 28 crosses the 0° mirror angle line and starts its +5° sweep to the photocell b. At time b1 a reset pulse b1 is produced (FIG. 22B) which enters the reset input R of the flip-flop 110 by line 114, and the $\bar{Q}$ output of the flip-flop on line 120 goes positive with the Q output going negative. As the beam continues its swing on the plus 5 degree swing of the mirror, it returns and is reintercepted by the photocell b at time b2. A pulse b2 is generated (FIG. 22B) which enters the reset input of the flip-flop 110; however, since the flip-flop was previously reset by the pulse b1, the pulse b2 has no effect on the flip-flop. The diagrams show one more half-cycle. After the beam is intercepted at time b2, as just described, it crosses the 0° reference line and again intercepts the photocell a at time a3(a1) which provides a set pulse a1 (FIG. 22B) that enters the set input of the flip-flop 110 and sets it again, it being recalled that it has previously been reset by the pulse b1. Continuing on for an additional half cycle of mirror swing, the beam is again intercepted by the sensor a at time a4(a2), but this pulse a4 (FIG. 22B) has no effect because of the just previous set pulse a3. The beam continues on, and during the plus five degree mirror swing angle is intercepted by the photocell b at time b3(b1) that provides another reset pulse b3 (FIG. 22B) for the reset input of the flip-flop 110.

Referring to FIG. 22C, utilization of the flip-flop outputs 118, 120 to operate the up/down counter 116 is illustrated schematically. When the flip-flop 110 was set by a pulse a1, the Q output voltage went positive (high) to a voltage V1 and this voltage remains positive for the time t1 unit the flip-flop is reset by the reset pulse b1. While the voltage V1 from the Q output of the flip-flop is high, the output voltage V1a from the $\bar{Q}$ output of the flip-flop 110 is low, i.e., zero volts.

The aforesaid positive voltage V1 applied to the "UP" input of the counter 116 causes the counter to count up, whereas the zero voltage input to the "DOWN" input suppresses counting down.

At the time of the b1 reset pulse (FIG. 22B) when the flip-flop 110 is reset, as previously described, the $\bar{Q}$ flip-flop output voltage goes to a positive voltage V2 (high) while the Q output voltage V2a of the flip-flop goes down to zero, stopping the count-up operation of the counter. The $\bar{Q}$ count-down voltage V2 remains positive during the length of time t2, which is the time between that time when the b1 reset pulse was received by the flip-flop and the time when the beam is again intercepted by the photosensor a to produce the set pulse a3(a1) of FIG. 22B. The positive voltage V2 is applied to the "DOWN" input of the up/down counter 116 which now counts down during the time t2 under the control, as always, of the oscillator or clock 122. As described, the counter 116 output provides the time difference (t1-t2) which is available at line 134 as an input to the register 126.

One-Shot Operation

The register 126 is conditioned for loading, that is, for receiving the output of the counter 116, during one complete mirror sweep cycle by the one-shot pulse generator 128. The one-shot 128 is connected by the line 130 (FIG. 22C) to the $\bar{Q}$ output 120 of the flip-flop 110 and is triggered by the low $\bar{Q}$ pulse that is produced when the flip-flop is set. When the one-shot 128 is triggered, its output in line 132 goes positive (high) at V3 (FIG. 22C) and the positive-going voltage is applied to the "LOAD" input of the register 126 which enables it to receive the previously measured count difference information (t1-t2) stored in the counter. The positive pulse V3 from the one-shot 128 remains positive for a very short period of time (e.g. 500 nanoseconds) which is sufficient for transfer to take place, but the one-shot pulse duration is miniscule compared to the clock pulse interval of about 0.02 milliseconds. The down-going voltage V3a of the pulse from one-shot 128 activates the second one-shot 140 via input 142, which provides an up-going voltage (high) pulse V4. This pulse, which is also of short duration, is applied to the "CLEAR" input of the up/down counter 116 and clears that counter of its binary time difference information measured during the previous mirror sweep cycle, but the counter is not cleared until its information has been transferred to the register 126. The counter 116 is now ready to receive a new set of up/down counting voltages V1, V2 from the flip-flop 110 until it receives the next clear pulse V4 from the one-shot 140. As mentioned, the duration of the pulse V3, V3a from the first one-shot 128, although it is long enough (500 nanoseconds) to set the register 126 for loading from the counter, is many times shorter than the interval between clock pulses and has no effect on the accuracy of the count as determined by the counter.

FIG. 22D is a schematic illustration of the clock pulses from the clock 122 which are at 49.14 KHz in the present example. It should be noted that the one-shot pulse durations of FIG. 22C and the clock pulse intervals of FIG. 22D are not drawn to scale, the one-shot pulse durations being insignificant relative to the clock pulse intervals as pointed out.

As previously described, with zero toe, the sweep times t1 amd t2 are equal, and therefore the clock pulses counted up will equal the clock pulses counted down and the difference signal exiting the register 126 will be zero, resulting in a zero reading on the total toe meter TT (FIG. 1).

Toe In

FIGS. 23A-23D are similar to FIGS. 22A-22D, previously described, except that FIGS. 23A-23D are representative of conditions when the total toe between the front wheels is a toe in. The principles of computing the time difference (t2-t1), which represents the total toe, are the same as those just described. Also, FIGS. 23A and 23B correspond to FIG. 19B and FIG. 19A, respectively, previously described as illustrating the principles of operation of the time-based, swept beam aligner of the present invention.

Referring to the mirror swing angle diagram of FIG. 23A (which illustrates the corresponding ±10° beam sweep), it will be noticed that during the minus five degree sweep angle of the mirror (−10° beam sweep) both photosensors intercept the reflected beam because, as shown in FIGS. 19 and 19A, the zero degree mirror angle position of the reflected beam B2(r) is offset to the right by the distance T from the mechanical reference line r that is centered between the sensors a, b. Thus, as seen in FIG. 23A, with toe in, both sensors intercept the reflected beam on the minus 5° sweep of the mirror (−10° beam sweep), and neither sensor intercepts the beam on the plus 5° sweep of the mirror.

In FIG. 23A, the first intercept by sensor b is actually the second successive interception by sensor b and, hence, has no effect. The first interception by sensor a is at time a1 in FIG. 23A, producing a set pulse a1 (FIG. 23B). However, with toe in, the set pulse a1 occurs later than it did under the zero toe conditions of FIG. 22A. Also, the reset pulse b1 is produced before the mirror returns to its zero reference line. The beam is not intercepted by either photosensor during the +5° mirror excursion but the b, a photocell intercept conditions first described are then repeated on the −5° mirror excursion.

The toe in conditions of FIGS. 23A-23C are such that time t1 representing the duration of the positive voltage V1 from the Q output of the flip-flop 110 is shorter than the time t2 representing the duration of the following positive voltage V2 from $\bar{Q}$ output. Thus, a greater number of clock pulses are counted during time t2 than are counted during time t1, and the count difference (t2−t1) output from the register 126 is positive and is proportional to the value T of toe in. This value will be read on the total toe meter TT shown in FIG. 1.

Toe Out

FIGS. 24A-24D resemble FIGS. 23A-23D except that they are representative of conditions when the total front wheel toe is toe out. Under such circumstances, as seen in FIG. 24A and in FIG. 24B, the sensors a, b intercept the reflected beam on the plus five degree swing of the mirror 28 (+10° beam sweep). During the −10° beam sweep, the reflected beam is not intercepted by the sensors. In other words, the conditions of FIG. 24A represent, in effect, mirror images of the conditions of FIG. 23A.

As shown in FIG. 24C, under toe out conditions, the time t1, representing the duration of the positive voltage V1 from the Q output of the flip-flop 110 is longer than the time t2 representing the duration of the positive voltage V2 from the $\bar{Q}$ output of the flip-flop. Accordingly, more clock pulses are counted during time t1 than are counted during time t2 and the time difference (t2−t1) from the output of the register 126 is negative. The negative toe representation is converted to a scaled negative voltage and displayed on the total toe meter TT (FIG. 1) as a representation of the total toe out of the front wheels.

Specific Circuit Example

FIG. 25 is a schematic diagram of the circuit C of FIG. 21, redrawn to show the utilization of commercially available integrated circuit elements. The basic functions of the elements in the circuit of FIG. 25 are like those previously described. FIG. 25A shows the catalogue number of the various components as offered by Texas Instruments Inc. of Dallas, Texas and by Analog Devices Inc. of Norwood, Mass.

in the circuit of FIG. 25, the set input of the flip-flop 110 is designated PR and the reset input is designated CLR. In this component 110, the set and reset inputs respond to negative going voltages (to be referred to as "lows"), and hence inverters 112a and 114a are inserted between the sensors a, b and the flip-flop 110.

In the embodiment of the invention described, in order to obtain the accuracy desired for measuring front wheel toe, it is desirable to provide up/down counter outputs in the form of twelve binary bits. This can be accomplished by connecting three up/down counter units 116a, 116b, and 116c in series as shown in FIG. 25. Each of the counter units has a four bit output QA-QD with QA being the least significant bit (LSB), and when three of such units are connected in series they provide the desired twelve-bit output. The up/down inputs are enabled by "NAND" gates 118a and 120a connected between the flip-flop lines 118, 120 and the first counter unit 116a. The clock 122 forms the other input to each of the NAND gates. The inputs to the up/down counter unit 116a are respectively activated by negative going voltages (to be called "lows") and suppressed by positive going voltages (highs). Thus, when the NAND gate 118a receives a high from the Q output of flip-flop 110, each subsequent high pulse from the clock 122 provides a low to the UP terminal of the counter to cause an UP count. At the same time, the NAND gate 120a is receiving a low from the $\overline{Q}$ flip-flop output and is thereby disabled, which suppresses the DOWN count of the counters.

When the sensor b intercepts the reflected beam, a low is received by the reset terminal CLR of the flip-flop 110 from the inverter 114a, and the inverter 112a will concurrently provide a high to the set input PR of the flip-flop. Thus, conditions are reversed in that the NAND gate 120a is enabled by receiving a high from the $\overline{Q}$ output of the flip-flop, and each subsequent clock pulse increments the counter 116 downwardly.

The $\overline{Q}A$–$\overline{Q}D$ binary bits from the counter units 116a–116c are connected to corresponding four-bit, bistable latch registers 126a–126c. The ENABLE terminals 1-2 and 3-4 of the registers 126a–126c are connected in series in order to provide for the storage of twelve bits of information during one mirror sweep cycle.

The one-shots 128 and 140 are connected as shown and are (for example) provided with reference voltages Vcc of +5 volts. The one-shots include RC timing circuits 128a, 140a which determine the duration of the one-shot pulses (such as 500 nanoseconds).

The $\overline{Q}1$–$\overline{Q}4$ outputs of the registers 126a–126c are connected to the input terminals of a digital/analog converter 136 such as the converter No. DAC 1118 made by Analog Devices Inc. of Norwood, Massachusetts. In the circuit shown, the D/A converter has input coding for a two's format, and the inputs are connected from the LSB (least significant bit) input 12 on down to the MSB (most significant bit) input 1 of the converter. The output of the converter, in line 138, is a voltage analog of the binary time difference input bits, and, in the embodiment described, can range from plus or minus 10 volts in 4.83 millivolt steps. This output is connected by line 138 to the volt meter TT that measures total toe, as previously described. Of course, other circuit elements can be employed, and the output of the converter need not be a voltage analog, e.g., it could operate a numerical display. Also, a properly programmed microprocessor unit can be utilized in place of the standard units wired as shown in FIG. 25. These variations all lie within the skill of the normal logic circuitry techniques of one skilled in the art.

Left Front Wheel Alignment

As shown in FIGS. 1 and 2, the present invention also provides means for determining the individal toe of the left front wheel LF. This system employs the rear oscillating mirror 30, which swings the beam B4, previously described, back and forth through swing angles S3, S4 of ±25°. The reflected beam B4 is intercepted by the rear photocells c, d, and the intercept signals from these photocells are received by the circuit C1 which performs the same function as the circuit C as previously described in connection with FIGS. 21 and 25. The sweep time difference (t2-t1) during a single mirror swing cycle is measured as a binary count which is converted into an analog voltage proportional to left wheel toe and is displayed on the left toe mater LT.

Once left wheel toe is determined individually as just described, the left wheel adjuster 14a (FIG. 1) can be manipulated until the left wheel LF is toed in by ½ of the specified total toe, using the left toe meter LT. The right wheel RF can then be toed in by the other ½ of the speified total toe by manipulating the adjuster 14b (FIG. 1) and noting the total toe reading of meter TT. This procedure forms the subject matter of the copending United States patent application of Melvin H. Lill, Ser. No. 773,639, filed on Mar. 2, 1977.

Run-Out Correction

If the plane of the rim of a front wheel is not perpendicular to the spindle axis of that wheel or if the projector mounting fixture is not parallel to the plane of the wheel, the projector P will wobble as the wheel is rotated. This wobble is commonly termed "run-out," and the run-out components in the horizontal plane have the same effect as alternating wheel toe in and toe out effects. Accordingly, if accuracy in toe alignment is desired, wheel run-out should be measured and compensated for.

In the present system, the run-out of the left front wheel can be observed if the wheel is jacked up and the wheel rotated, with projector P remaining horizontally disposed. Run-out in the plane which varies the left wheel toe reading will show up as oscillation in the left toe meter LT. Toe error due to run-out of the left front wheel can be eliminated by stopping rotation and lowering that wheel to the ground at the midpoint of meter oscillation. The same procedure can be employed to subsequently remove the effect of run-out of the right front wheel RF by using the total toe meter TT. Alternatively, the run-out corrections could be introduced into the system as binary informaton just ahead of the digital/analog converter 136, the measurements being made in accordance with the copending United States patent application of Melvin H. Lill et al, filed on or about Mar. 22, 1978 and entitled "Runout Compensation In Vehicle Wheel Alignment Apparatus," Ser. No. 889,167.

Typical Operating Procedure

The basic steps of a typical operating procedure employing the system of the present invention will now be briefly described.

1. Mount the projector P and roof mirrors M, M1 on their respective wheels, as shown in FIG. 1.
2. Successively jack up the two front wheels and determine the position of zero run-out in the toe plane and let the wheels down, at zero run-out, described under the description of run-out correction.
3. If the vehicle is of the type described in connection with FIG. 1, wherein the steering wheel 20 has a nominal straight ahead position that provides symmetrical steering wheel geometry, set the steering wheel to its factory determined straight ahead position.
4. Obtain factory specifications on the total toe angle between the front wheels.
5. Utilizing the circuit C1 and the left toe meter LT, determine the individual toe of the left front wheel LF.
6. Using the toe angle adjustment 14a shown in FIG. 1, the circuit C1 and the left wheel toe meter LT, adjust the toe of the left front wheel so that the left toe meter reads one half of the factory specified total toe angle.
7. Using the circuit C and the total toe meter TT, determine the total toe now remaining between the front wheels. If the wheels are correctly aligned this should equal the factory specified total toe.

8. If the total toe is not at specification, manipulate the adjustment 14b for the right front wheel to alter its toe angle until the total toe meter TT reads the factory specified total toe. This adjustment should turn the wheel in one direction if the toe meter indicates toe out or indicates insufficient toe in and should turn the wheel in the other direction if the total toe meter TT indicates total toe in that exceeds that of the factory specifications.

Having completed the detailed description of the preferred embodiment of the invention, it can be seen that the system of the present invention includes a light beam projector mounted on one front wheel with at least one oscillating mirror for sweeping the beam of light back and forth through a predetermined angle. Photosensor means provide intercept signals when they intercept the beam and circuit means converts said signals into wheel alignment data. The principle involved is basically that of providing a first timing scheme for measuring the elapsed time between intercept signals when the beam sweeps from the photosensor means and back thereto, a second timing scheme for measuring the elapsed time between the intercept signals when the beam continues its sweep from the photosensor means and returns thereto, means for determining the difference between the elapsed times, and means for converting said time difference into a signal that is an analog of wheel toe.

In the preferred embodiment, the sensor means employs two closely spaced photocells centered about a zero toe angle reference line. Two cells are employed because as they intercept the light beam on an outgoing excursion, the intercept signals occur in one order and when they again intercept the beam on a return excursion the intercept signals occur in the opposite order. This, in effect, senses the direction of beam sweep and makes the differentiation between toe in and toe out determinations possible.

Modified Form of the Invention

In the preferred embodiment of the invention just described, the directional motion of the sweeping beams was sensed by means which included the use of paired photosensors, a, b and c, d equally spaced on opposite sides of a mechanical zero mirror angle reference line. Thus, in measuring total toe, for example, when the wheels were toed in the effective sensing order was b-a-a-b, and for toe out the effective sensing order was a-b-b-a, which difference in effective sensing orders was employed to distinguish between toe in and toe out.

In the modified embodiment of FIGS. 26-32, a different means for sensing the direction of sweep of the beam is employed. In the modified system, only a single photocell is required for each swinging mirror, which photocell is placed in line with the beam projected from the zero mirror angle reference line. In order to sense the direction of beam sweep, a switch is operated by the synchronous motor that swings the mirrors. Electronic circuitry, which receives inputs from the photocell and from the switch, is provided for sensing the direction of beam sweep. In this embodiment, the sweep times t1 and t2, are measured between successive interceptions of the beam by the same photocell.

Mechanical Arrangement

FIGS. 26 and 27 illustrate, in simplified form, the changes necessary to produce a sweep system using a single photosensor for each beam. FIG. 26 illustrates the modified aligner in generally the same manner as FIG. 5, previously described in connection with the first embodiment of the invention. Those elements common to both figures are given the same reference characters, and their descriptions will not be repeated. As seen in FIG. 26, the photocells a, b for the front reflected beam B2 have been replaced by a single photosensor e. This sensor is disposed on the common reference line r which was formerly midway between the photocells a, b. Similarly, the rear photosensors c and d have been replaced by a single rear sensor f that receives the reflected beam B4.

In order to provide information as to the direction in which the beam is sweeping when it intercepts the front beam photocell e, for example, mechanically operated pulse producing means have been added to the system. In the form shown, this pulse producing means includes a cam 150 (FIGS. 26 and 27) mounted on and driven by the synchronous motor shaft 62. The cam 150 operates a switch arm 152 of a microswitch MS having a normally closed movable contact 153 (FIGS. 27 and 31) connected to a ground line 154 and a fixed contact 155 (FIGS. 27 and 31) that receives a reference voltage (such as +5 volts) through a circuit input line 156 and a resistor 157. When the switch contacts 153, 155 are permitted to close by the cam 150, the voltage on line 156 drops to zero. When the switch contacts are opened by the cam 150, the voltage on line 156 increases to +5 volts (for example).

It is noted that the duration of the switching periods (the time required to either open or close the switch contacts) of the microswitch MS and the precise timing of those periods are not critical in the embodiment of the invention being described. There are only two requirements relative to the cam-operated switch arrangement; these are (1) that each switching period takes place between the times the reflected beam is successively intercepted by the single photosenspr; and (2) that the duration of the switching periods be shorter than the length of time required for the beam to be successively intercepted by the photosensor. In order to attain these objectives, the switch MS is a conventional rapid acting microswitch, and the switch and cam 150 are so oriented that the switch is closed at about 90° of timing motor shaft rotation and is opened at about 270° of timing motor shaft rotation. Since the sensor intercepts the reflected beam at about 0° and 180° of timing motor shaft rotation, the above requirements are readily met with an ample factor of safety by a switch whose opening and closing time periods are in the order of 40 milliseconds.

Operating the switch MS at about 90 and 270 degrees of motor shaft rotation is readily accomplished by forming the cam 150 as a two-lobe cam having switch operating ramps CR1 and CR2 which are 180° apart. The switch arm 152 is mounted relative to the cam so that the ramps CR1 and CR2 operate the arm 152 at about the 90° and 270° rotation positions of the motor shaft 62.

Principle of Operation

FIG. 28 is a time-based diagram like some of those previously discussed (such as the diagram of FIG. 23A) but showing front beam sweep as a function of timing motor rotation, the mirror being at its zero swing angle at 0° and 180° of timing motor rotation. FIG. 28 illustrates the vehicle wheel condition of toe in. It is to be understood that at zero toe conditions, the sensor e would be intercepted at 0° and 180° of motor rotation, corresponding to the zero degree mirror angle line. However, in FIG. 28, with toe in of the front wheels, the first intercept by the sensor e is at time e1 and the intercept occurs as the reflected beam B2 is moving from its zero degree mirror angle reference position toward its maximum negative sweep position, i.e., projected beam B2 is moving to the +10° position. As the beam B2 returns from its −10° sweep, the sensor e is again intercepted at time e2, which precedes the time when the timing motor shaft is at 180° of rotation.

The beam B2 continues its sweep to the +10° position and then returns to the zero degree mirror angle reference position at 360° (0°) of timing motor shaft rotation, whereupon the beam repeats its −10° sweep and return cycle. During the +10° sweep of beam B2, due to the fact that there is toe in, the reflected beam is not intercepted by the photosensor e. As the beam B2 repeats its −10° sweep, the reflected beam is intercepted by the sensor at time e3(e1), and when it returns the sensor again intercepts the reflected beam at time e4(e2). In accordance with the modified form of the present invention, the circuitry measures time t1 (FIGS. 28 and 29) between the first and second interception times e1, e2 and te time t2 between the second and third interception times e2, e3. The time between interception times e3 and e4 is equal to the time t1.

As with the previously described embodiment of the invention, the circuitry compares time t2 with t1 and produces a binary signal equal to (t2−t1) which represents total toe of the front wheels. This binary information is converted by a digital/analog converter to analog information, such as a voltage, and is displayed on the toal toe meter TT, as previously described.

Circuitry of Modified Embodiment

The simplified diagram of FIG. 29 illustrates the principles of the use of a single photosensor and a timed switch as the means for generating signals for the up-/down counter via the flip-flop 110 previously described. As seen in FIG. 29 as well as in the circuit diagram of FIG. 31, the switch output voltage line 156 is connected directly to a set NAND gate 160 and to a reset NAND gate 162 through an inverter 164. The single photosensor e for measuring total toe is connected by line 112a to both NAND gates 160 and 162.

The cam-switch diagram in FIGS. 27 and 31 shows the conditions at 0° of shaft rotation, 90° after the cam ramp CR1 has opened the switch MS. As shown, the cam lobe will keep the switch open for about 180°. Referring to FIGS. 28 and 29, it will be seen that the switch was opened by cam ramp CR1 at time MS1, or at about 270° of timing motor rotation. The switch remains open through 0° of timing motor rotation up to about 90° of timing motor rotation. At 90°, the switch closes as the cam ramp CR2 comes under the switch arm 152 and switch arm 153 engages contact 155 grounding out the five volt supply 157 at time MS2. Thus the switch is open from about 270° (through 0°) to about 90° of timing motor rotation.

As is also shown in the diagram of FIG. 29, when the reflected beam is intercepted by sensor e at time e1 (just past 0° of shaft rotation for toe in), the sensor produces a pulse in the input line 156 for both NAND gates 160 and 162, and when the beam is again intercepted by sensor e just before 180° of motor rotation at the time e2, the sensor again produces a pulse for the input line 156 for both NAND gates. As will be seen, the sensor pulse at time e1 is a set pulse for the flip-flop 110 and the sensor pulse at time e2 is a reset pulse.

Count Up

Referring back to the switching conditions illustrated in the circuit diagram of FIG. 31, the switch contacts have been opened by ramp CR1 of the cam 150. Under these circumstances, the open switch applies a positive voltage 170 (FIG. 29) to line 156 for both NAND gates 160, 162. As seen by comparing FIG. 28 with FIG. 29, the switch will be open at the time the beam is intercepted by the photosensor at time e1, which is just past zero degrees of timing motor rotation, because there is toe in. The two resultant highs to NAND gate 160 cause the gate to apply a low pulse to the PR (set) terminal of the flip-flop 110 setting the flip-flop and providing a high at its Q output. However, the connection of line 156 to the NAND gate 162 is through the inverter 164 so that when the switch is opened, the gate 162 receives a low and is disabled. Under these conditions, and as shown in FIG. 30, the counter 116a counts up those clock pulses received during the measuring time t1, as described in connection with the circuit diagram of FIG. 25 (which description will not be repeated).

Count Down

When the ramp CR2 of the cam 150 comes under the switch arm 152, the switch closes, grounding line 156 through line 154. As seen in FIGS. 28 and 29, the switch closes at about 90° of timing motor rotation, which is time MS2 in FIG. 29. With the switch closed, input line 156 to both NAND gates 160, 162 goes to a low voltage 172 (FIG. 29). When the photosensor e next intercepts the beam at time e2, the resulting reset pulse e2 (FIG. 29) is applied by line 112a to both NAND gates 160, 162. The gate 160 now receives a low from the switch and is disabled. Simultaneously, the NAND gate 162 receives a high voltage from the switch line 156 (due to the inverter 164) and a pulse from the sensor at time e2 so that the gate 162 applies a low to the CLR (reset) input of the flip-flop 110. The aforesaid reversal of input voltages to the flip-flop resets it, which places the counter in its count down mode whereupon the subsequent clock pulses are counted down during measuring time t2, as previously described in connection with FIG. 25.

Thus, with the single photocell e and the switch MS, the count-up and count-down times t1, t2 are developed as with the first described embodiment. As indicated in FIG. 30 and as seen in FIG. 31 the circuit C2 includes a pair of one-shot circuits 128, 140 which have the same function as those of FIG. 25, a description of which will not be repeated. As in the previously described circuit, the circuit of FIG. 31 has an output which is an analog of the time difference (t2−t1) and which is employed as a measure of toe angle.

The table of FIG. 32 lists the catalog number and the supplier of components suitable for the circuit of FIG. 31, the difference between the circuit of FIG. 31 and that of FIG. 25 being that the circuit of FIG. 31 requires an inverter and two NAND gates for controlling the flip-flop 110 instead of two inverters.

A circuit C2 like that of FIG. 31 is also employed in connection with the rear swinging mirror 30 and the rear photosensor f to provide an individual toe reading for the left front wheel.

Thus it can be seen that in the modified embodiment of the invention just described, a time-based swept beam system is provided wherein the photosensor means for each swinging mirror includes only a single sensor instead of a pair of sensors.

Although the best modes contemplated for carrying out the present invention have been herein shown and described, it will be apparent that modification and variation may be made without departing from what is regarded to be the subject matter of the invention as defined in the appended claims.

What is claimed is:

1. In a system for measuring vehicle wheel alignment, said system being of the type comprising light beam projector means mounted on one wheel, cycle means for sweeping the light beam back and forth through a predetermined angle, photosensor means associated with a vehicle wheel for providing intercept signals when the photosensor means intercepts the beam during a sweep cycle and circuit means for converting said signals into wheel alignment data; the improvement comprising means for sweeping said light beam through a predetermined sweep angle, said circuit means comprising means for measuring the elapsed time between intercept signals when the beam sweeps in one direction from said photosensor means and back thereto, means for measuring the elapsed time between intercept signals when the beam continues its sweep in the opposite direction from said photosensor means and back thereto, means for determining the time difference between said elapsed times, and means for converting said time difference into wheel alignment data.

2. The system of claim 1, wherein the system measures total front wheel toe with said projector means being mounted on one front wheel, mirror means mounted on the opposite front wheel for reflecting the beam back toward said projector means, said photosensor means being disposed at said projector means for intercepting said reflected beam.

3. The system of claim 2, wherein said mirror means comprises a roof mirror for directing the reflected beam parallel to the incident beam.

4. The system of claim 1, wherein said time measuring means and said difference determining means comprise binary counter means for measuring said elapsed time between intercept signals and a clock for providing a time base for said counter means, said counter means providing binary output signals representing said elapsed time difference.

5. The system of claim 4, wherein said converting means converts said binary output signals to an analog voltage signal, and meter means for displaying said voltage signal in terms of wheel toe.

6. A system for measuring the toe of front vehicle wheels, said system comprising aligner means mounted on one front wheel, a mirror on the opposite front wheel, said aligner means comprising a projector for projecting a beam of light in a predetermined direction relative to the axis of the wheel upon which it is mounted, means for cyclically sweeping the light beam back and forth across said mirror through a predetermined sweep angle, photosensor means at said aligner means for providing intercept signals when the photosensor means intercepts the beam reflected from said mirror during a sweep cycle, circuit means connected to said photosensor means, said circuit means comprising means for measuring the elapsed time between intercept signals when the beam sweeps in one direction from said photosensor means and back thereto, means for measuring the elapsed time between intercept signals when the beam continues its sweep in the opposite direction from said photosensor means and back thereto, means for determining the time difference between said elapsed times, and means for converting said time difference into front wheel total toe data.

7. A system for measuring the toe of front vehicle wheels, said system comprising aligner means mounted on one front wheel, a mirror mounted on the opposite front wheel, said aligner means comprising a projector for projecting a beam of light in a direction generally perpendicular to the axis of said one front wheel, a swinging mirror for deflecting the beam substantially 90° in the horizontal plane at zero degrees mirror swing angle, means for oscillating said swinging mirror for cyclically sweeping the light beam back and forth across said mirror through predetermined angles on each side of said zero degree mirror swing angle, said light beam being reflected back in a common vertical plane at said zero mirror swing angle when there is zero front wheel toe, photosensor means at said aligner means for providing intercept signals when the photosensor means intercepts the beam reflected from said mirror during a sweep cycle, circuit means connected to said photosensor means, said circuit means comprising first timing means for measuring the elapsed time between intercept signals when the beam sweeps in one direction from said photosensor means and back thereto, second timing means for measuring the elapsed time between intercept signals when the beam continues its sweep in the opposite direction from said photosensor means and back thereto, means for determining the time difference between said elapsed times, and means for converting said time difference into front wheel total toe data.

8. The system of claim 7, wherein said photosensor means comprises two photocells with one photocell being spaced a short distance in one direction from a reference line representing the path of the projected beam at said zero degree mirror swing angle and when the wheel mounting said projector has zero toe, the other photocell being equally spaced in the opposite direction from said reference line, said first timing means measuring the elapsed time between the first intercept signal from one photocell as the beam sweeps away from said reference line and the first intercept signal from the other photocell as the beam sweeps back toward said reference line, said second timing means measuring the elapsed time between said first intercept signal from said other photocell and the next intercept signal from said one photocell as the beam continues to sweep.

9. The system of claim 8, wherein said photocells are respectively connected to the set and reset inputs of a flip-flop.

10. A system for measuring the total toe of front vehicle wheels and the individual toe of one of said front wheels, said system comprising projector means mounted on one front wheel including means for projecting a light beam in a predetermined direction generally perpendicular to the axis of said one front wheel, a front mirror mounted on the opposite front wheel in a position whereby an incident light beam parallel to the wheel axis would be reflected back in a common vertical plane, a rear mirror mounted on the rear wheel that is directly behind said one front wheel, sand projector means projecting a beam of light in a forward direction generally in said predetermined direction, a front swinging mirror for deflecting said forwardly directed beam substantially 90° in the horizontal plane when said front swinging mirror is at its zero degrees swing angle, a rear swinging mirror for directing a portion of said beam rearwardly of said vehicle in a direction opposite to said predetermined direction, beam splitter and optical means for directing a portion of said forwardly directed beam to said rear swinging mirror, said rear swinging mirror swinging said beam portion in the horizontal plane about a second zero degree mirror swing angle, synchronous motor means for oscillating both swinging mirrors for cyclically sweeping their respective beam portions back and forth across their respected fixed mirrors through predetermined swing angles on each side of their respective zero mirror degree swing angles, said front light beam portion being reflected back in a common vertical plane at zero degrees mirror swing angle when there is zero total front wheel toe, said rear light beam being reflected back in a common vertical plane when said one front wheel has zero toe, front and rear photosensor means at said projector means, the front photosensor means intercepting the beam reflected from said front mirror and the rear photosensor means intercepting the beam reflected from said rear mirror, each of said photosensor means providing intercept signals when the photosensor means intercepts the beam reflected from the associated mirror during a complete sweep cycle, circuit means connected to both said front and said rear photosensor means, said circuit means each comprising means for measuring the elapsed time between intercept signals when the beam sweeps in one direction from the associated photsensor means and back thereto, means for measuring the elapsed time between intercept signals when the beam continues its sweep in the opposite direction from said associated photosensor means and back thereto, means for determining the time differences between said elapsed times for the front beam and for the rear beam, means for converting said time difference for the front beam into front wheel total toe data, and means for converting said time difference for the rear beam into individual toe data for said one front wheel.

11. A wheel alignment measuring system comprising a light beam projector for mounting on one of the front wheels of a vehicle, said projector projecting a light beam at predetermined angular relationships with the axis of said one wheel, means for swinging said light beam in a horizontal plane through a predetermined sweep angle, photosensor means positioned to intercept said beam during its predetermined sweep for providing an intercept signal, means for measuring the elapsed time between signals when the beam sweeps in one direction from said photosensor means to a point where its position is again detected, means for measuring the elapsed time between signals when the beam sweeps in the opposite direction from said photosensor means to a point where its position is again detected, means for determining the time difference between said elapsed times, and means for converting said time difference into wheel alignment data.

12. A wheel alignment measuring system as set forth in claim 11 wherein the photosensor is mounted at said projector, and a mirror mounted so as to reflect the beam projected from said projector back to said photosensor.

13. A wheel alignment measuring system as set forth in claim 12 wherein said mirror is a roof mirror for directing the reflected beam parallel to the incident beam.

14. A wheel alignment measuring system as set forth in claim 12 wherein said mirror is arranged to be mounted to the rear wheel on the same side of said vehicle as said one front wheel, said projector projecting said beam about a reference line generally parallel to the plane of said one front wheel.

15. A wheel alignment measuring system as set forth in claim 12 wherein said mirror is arranged to be mounted on the front wheel opposite of said one front wheel, said projector projecting said beam about a reference line generally parallel to the axis of said one front wheel.

16. A wheel alignment measuring system as set forth in claim 11 wherein said elapsed time measuring means and said means for determining the time difference comprise an up/down counter.

17. A wheel alignment measuring system as set forth in claim 11 including means for sensing the direction in which the beam is sweeping relative to the photosensor means at any given time in order to determine whether said time difference is representative of a toe out or toe in condition of said one front wheel.

18. A wheel alignment measuring system as set forth in claim 17 wherein said photosensor means comprises two closely spaced photocells, and said beam sweep direction sensing means comprises circuitry responsive only to the first of the two successive intercept signals from the same photocell.

19. A wheel alignment measuring system as set forth in claim 17 wherein said beam sweep direction sensing means comprises switch means associated with said means for sweeping said beam.

20. A wheel alignment measuring system as set forth in claim 11 wherein said projector includes a housing, and means mounted within said housing for projecting said light beam in a direction generally parallel to the plane of said one front wheel, said beam sweeping means comprising a mirror mounted to intercept said projected light beam and means for swinging said mirror through a predetermined swing angle, said mirror being mounted in the forward portion of said housing to reflect said beam toward the other of the front wheels of the vehicle.

* * * * *